United States Patent
Magarill

(10) Patent No.: US 7,422,330 B2
(45) Date of Patent: Sep. 9, 2008

(54) ILLUMINATION SYSTEM AND PROJECTION SYSTEM USING SAME

(75) Inventor: Simon Magarill, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 189 days.

(21) Appl. No.: 11/094,671

(22) Filed: Mar. 30, 2005

(65) Prior Publication Data

US 2006/0221305 A1    Oct. 5, 2006

(51) Int. Cl.
G03B 21/00    (2006.01)
G03B 21/20    (2006.01)

(52) U.S. Cl. .......................................... 353/31; 353/85
(58) Field of Classification Search .................. 353/31, 353/85, 94, 84
See application file for complete search history.

(56) References Cited

U.S. PATENT DOCUMENTS

| | | | |
|---|---|---|---|
| 2,403,731 | A | 7/1946 | MacNeille |
| 4,221,464 | A | 9/1980 | Pedinoff et al. |
| 6,108,131 | A | 8/2000 | Hansen et al. |
| 6,609,795 | B2 | 8/2003 | Weber et al. |
| 6,648,475 | B1 | 11/2003 | Roddy et al. |
| 6,672,721 | B2 | 1/2004 | Aastuen et al. |
| 6,726,329 | B2 * | 4/2004 | Li et al. ........................ 353/20 |
| 6,769,772 | B2 * | 8/2004 | Roddy et al. .................. 353/31 |
| 6,786,604 | B2 | 9/2004 | Aastuen et al. |
| 6,870,523 | B1 | 3/2005 | Ben-Davis et al. |
| 7,001,022 | B2 * | 2/2006 | Kim et al. ..................... 353/31 |
| 7,088,321 | B1 * | 8/2006 | Parker ......................... 345/83 |
| 2003/0133080 | A1 * | 7/2003 | Ogawa et al. ................. 353/31 |
| 2004/0006665 | A1 | 1/2004 | Moss |
| 2004/0130784 | A1 | 7/2004 | Williams et al. |
| 2004/0207820 | A1 | 10/2004 | Roddy et al. |
| 2004/0263500 | A1 | 12/2004 | Sakata |
| 2005/0018141 | A1 * | 1/2005 | Hosaka ........................ 353/31 |
| 2005/0110955 | A1 * | 5/2005 | Trollsch et al. ............... 353/31 |

FOREIGN PATENT DOCUMENTS

| | | |
|---|---|---|
| EP | 1 489 854 A2 | 12/2004 |
| EP | 1 662 804 A1 | 5/2006 |
| WO | WO01/43113 | 6/2001 |

(Continued)

OTHER PUBLICATIONS

Conner, U.S. Appl. No. 10/895,705, filed on Jul. 21, 2004 as "Projection System with Scrolling Color Illumination".

(Continued)

*Primary Examiner*—Christopher Mahoney

(57) ABSTRACT

An illumination system, useful for generating illumination light in an image-projection system, has at least a first image-forming panel. A first array of light emitting elements, for example light emitting diodes (LEDs), generates a first light beam associated with a first wavelength range. A second array of light emitting elements generates a second light beam associated with a second wavelength range. The second array of light emitting elements comprises at least a first light emitting element generating light in the second wavelength range and a second light emitting element generating light in the first wavelength range. The center wavelength of the second light emitting element may be closer in value to the center wavelength of a light emitting element in the first array than to the center wavelength of the first light emitting element.

35 Claims, 8 Drawing Sheets

FOREIGN PATENT DOCUMENTS

| WO | WO03/088203 | 10/2003 |
|----|---|---|
| WO | WO2004/010407 | 1/2004 |
| WO | WO 2004/043076 | 5/2004 |
| WO | WO 2004/114003 | 12/2004 |
| WO | WO2005/013193 | 2/2005 |

OTHER PUBLICATIONS

Conner, U.S. Appl. No. 10/914,596, filed on Aug. 9, 2004 entitled "Projection Display System Using Multiple Light Sources and Polarizing Element for Using with Same".

Magarill, U.S. Appl. No. 10/923,945, filed on Aug. 23, 2004 entitled "Multiple Channel Illumination System".

Conner, U.S. Appl. No. 11/025,285, filed on Dec. 29, 2004 entitled "Illumination System Using Multiple Light Sources with Integrating Tunnel and Projection Systems Using Same".

Keuper, et al., "RGB LED Illuminator for Pocket-Sized Projectors", *SID 04 Digest*, 2004 pp. 943-945.

Priest, et al., "The Minimum Perceptible Colorimetric Purity as a Function of Dominant Wave-Length", Journal of the Optical Society of America, vol. 28, No. 5, May 1989, pp. 133-139.

\* cited by examiner

ILLUMINATION SYSTEM AND PROJECTION SYSTEM USING SAME

FIELD OF THE INVENTION

The present invention relates to illumination systems that may be used in projection systems and projection systems using the illumination systems. More specifically, the invention relates to illumination systems that include an array of light emitting elements, such as light emitting diodes (LEDs), to generate the illumination light.

BACKGROUND

Illumination systems have a variety of applications, including projection displays, backlights for liquid crystal displays (LCDs) and others. Projection systems usually include a source of light, illumination optics, an image-forming device, projection optics and a projection screen. The illumination optics collect the light generated by the light source and direct the collected light to one or more image-forming devices. The image-forming device(s), controlled by an electronically conditioned and processed digital video signal, produces an image light beam corresponding to the video signal. Projection optics magnify the image light beam and project it to the projection screen.

White light sources, such as arc lamps, have been, and still are, the predominant light sources used for projection display systems. In a three-panel projection system that uses a white light source, the light is split into three color channels, commonly red, green and blue and directed to respective panels that produce the image for each color. Other projection systems use only a single imager panel, and so rotating color wheels are commonly used to filter the white light so that only light from one color band is incident at the panel at one time. The light incident at the panel changes color sequentially red/green/blue/red and so on, and the panel is sequentially driven to form red/green/blue/red images synchronously with the incident light.

More recently, however, light emitting diodes (LEDs) have been considered as an alternative to white light sources. For a three-panel system, an array of red LEDs is used to illuminate the red channel, an array of green LEDs is used to illuminate the green channel and an array of blue LEDs is used to illuminate the blue channel. Some advantages of LED light sources include longer lifetime, higher efficiency and superior thermal characteristics.

LED-based illumination sources, however, display a color gamut that does not conform to recommended practices set forth by the Society of Motion Picture and Television Engineers in Recommended Practices 145-1999, "C Color Monitor Colorimetry" (referred to hereafter as SMPTS 145-1999). Also, in order to achieve an acceptable white color, LED-based illumination sources are often run in a mode that fails to realize the full intensity available from all the available LEDs, and so the overall brightness of the displayed image is reduced.

There remains a need to improve the color and brightness of LED-based illumination sources for projection systems.

SUMMARY OF THE INVENTION

One embodiment of the invention is directed to an optical system that comprises at least a first image-forming panel. A first array of light emitting elements, which may be light emitting diodes (LEDs), generates a first light beam associated with a first wavelength range. The first light beam is directed to the at least a first image-forming panel. A second array of light emitting elements generates a second light beam associated with a second wavelength range, the second array of light emitting elements comprising at least a first light emitting element generating light in the second wavelength range and a second light emitting element generating light in the first wavelength range, the second light beam being directed to the at least a first image-forming panel.

Another embodiment of the invention is directed to a projection system for projecting a color image. The system includes at least first, second and third image-forming panels. The first image-forming panel is associated with a first color component of the color image, the second image-forming panel is associated with a second color component of the color image and the third image-forming panel associated with a third color component of the color image. A first array of light emitting diodes (LEDs) is capable of generating a first light beam associated with the first color component. The first light beam is directed to the first image-forming panel. A second array of LEDs is capable of generating a second light beam associated with the second color component. The second light beam is directed to the second image-forming panel. A third array of LEDs is capable of generating a third light beam associated with the third color component. The third light beam is directed to the third image-forming panel. The wherein the first LED array comprises at least one LED generating light of the second color component.

Another embodiment of the invention is directed to an optical system that includes at least first and second image-forming panels and a first array of light emitting elements to generate a first light beam associated primarily with a first wavelength range. A first light emitting element of the first array produces light having a first center wavelength. The first light beam is directed to the first image-forming panel. A second array of light emitting elements generates a second light beam associated primarily with a second wavelength range. The second array of light emitting elements comprises at least a second light emitting element generating light having a second center wavelength and a third light emitting element generating light having a third center wavelength. The third center wavelength has a value closer to the first center wavelength than the second center wavelength. The second light beam is directed to the second image-forming panel.

The above summary of the present disclosure is not intended to describe each illustrated embodiment or every implementation of the present disclosure invention. The figures and the following detailed description more particularly exemplify these embodiments.

BRIEF DESCRIPTION OF THE DRAWINGS

The disclosure may be more completely understood in consideration of the following detailed description of various exemplary embodiments in connection with the accompanying drawings, in which.

Figure 1:
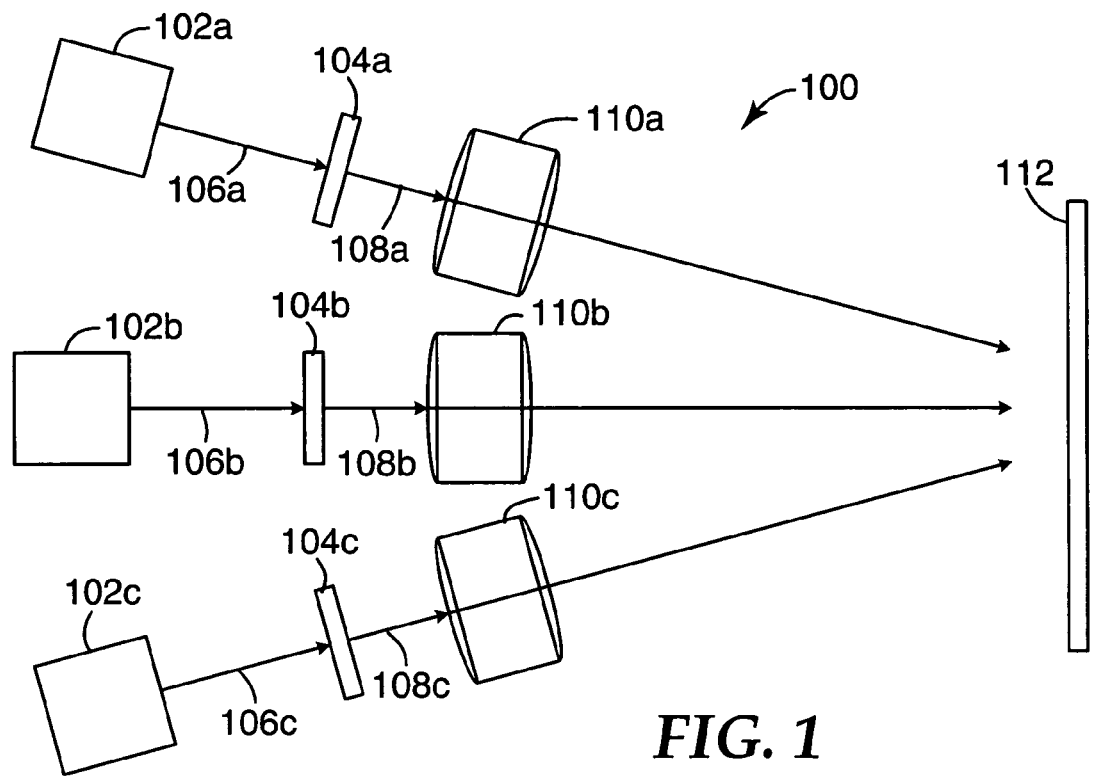
FIG. 1 schematically illustrates a projection system that may incorporate the present invention, wherein the projection system projects light in each color channel to a screen using a respective projection lens unit.

Like numerals in different figures refer to similar elements. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

LEDs with higher output power are becoming more readily available, which opens up new applications for LED illumination. Some applications that may be addressed with high power LEDs include their use as light sources in projection and display systems, as illumination sources in machine vision systems and camera/video applications, and even in distance illumination systems such as car headlights. LED-based light sources may be used in many different applications. One application for which illumination systems of the present disclosure are particularly suitable is the illumination of image-forming devices in projection systems. Such projection systems may be used, for example, in projection televisions.

LEDs typically emit light over a wide angle, and one of the challenges for the optical designer is to efficiently collect the light produced by an LED and direct the light to a selected target area. Another challenge is to achieve a set of colors that produce a desired white color while maintaining as bright an illuminated image as possible.

One embodiment of projection system 100, schematically illustrated in FIG. 1, comprises a number of differently colored light sources 102a, 102b, 102c that illuminate respective image-forming devices 104a, 104b, 104c, also referred to as image-forming panels. Each light source 102a, 102b, 102c may include a number of light emitting elements, such as light emitting diodes (LEDs) so as to generate a light beam having a particular color. Commonly, the light sources 102a, 102b, 102c generate respective red, green and blue illumination light beams.

The wavelength ranges associated a red beam may be, for example, from about 600 nm to about 700 nm, with a green beam from about 500 nm to about 600 nm, and with a blue beam from about 400 nm to about 500 nm. The upper and lower limits to these wavelength ranges are not exact and may vary from system to system. Also, there may be some overlap of wavelengths included in the light beams of the different colors. For example, a blue light beam may have an associated wavelength range from about 425 nm to about 490 nm, while a green light beam has a wavelength range from about 490 nm to about 600 nm.

The image-forming devices 104a, 104b, 104c may be any suitable type of image-forming device. For example, the image-forming devices 104a, 104b, 104c may be transmissive or reflective image-forming devices. Liquid crystal display (LCD) panels, both transmissive and reflective, may be used as image-forming devices. One example of a suitable type of transmissive LCD image-forming panel is a high temperature polysilicon (HTPS) LCD device. An example of a suitable type of reflective LCD panel is the liquid crystal on silicon (LCoS) panel. The LCD panels modulate an illumination light beam by polarization modulating light associated with selected pixels, and then separating the modulated light from the unmodulated light using a polarizer. Another type of image-forming device, referred to as a digital multimirror device (DMD), and supplied by Texas Instruments, Plano, Tex., under the brand name DLP™, uses an array of individually addressable mirrors, which either deflect the illumination light towards the projection lens or away from the projection lens. While the following description addresses both LCD and DLP™ type image-forming devices, there is no intention to restrict the scope of the present disclosure to only these two types of image-forming devices and illumination systems of the type described herein may use other types of devices for forming an image that is projected by a projection system.

Each colored illumination light beam 106a, 106b, 106c is incident at its respective image-forming device to produce colored image beams 108a, 108b, 108c. The colored image light beams 108a, 108b, 108c contain image information for each respective color and, in this particular embodiment, are projected by respective projection lens units 110a, 110b, 110c to a projection screen 112. Thus, the colored image light beams 108a, 108b, 108c are mixed with each other at the projection screen 112.

The exemplary embodiment illustrated in FIG. 1 is presented to show that the illumination system has are three different color channels, for example red, green and blue, each color channel including its own light source 102a, 102b, 102c that produces a respective illumination beam 106a, 106b, 106c. The figure is not intended to limit the invention to any particular type of image-forming panel or optical arrangement for illuminating the image-forming panels.

Figure 2:
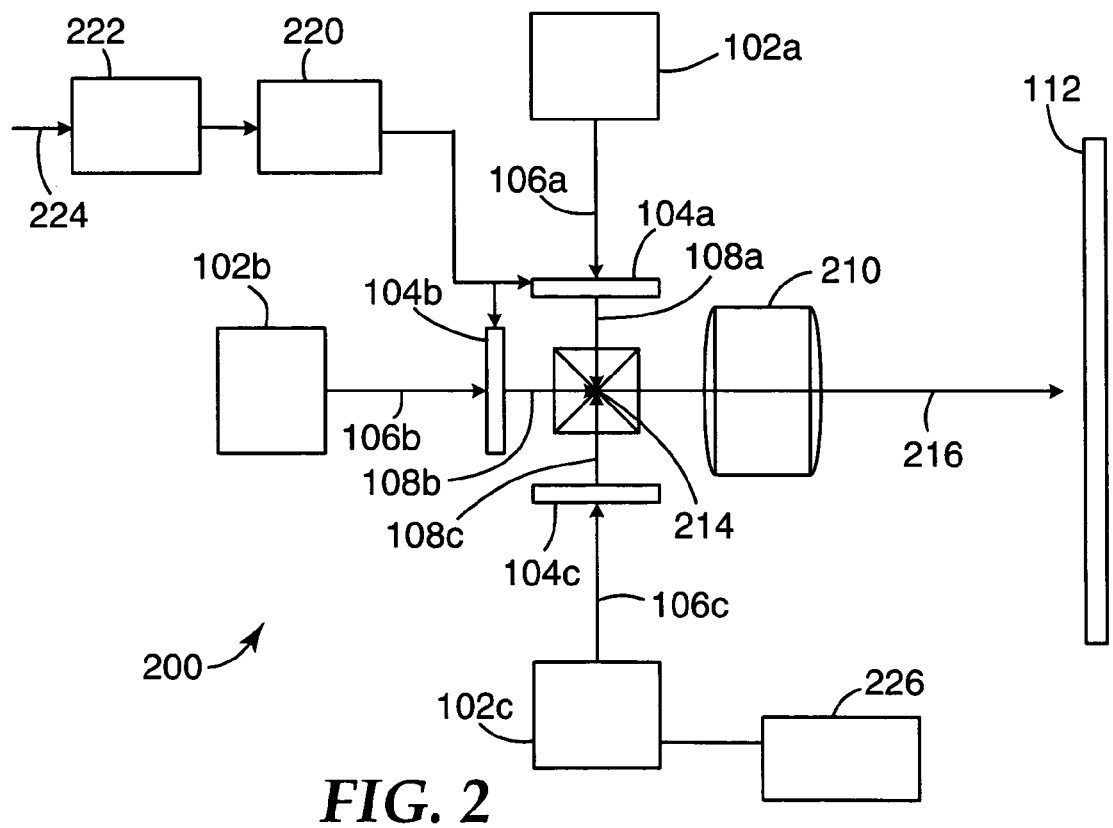
FIG. 2 schematically illustrates a projection system that may incorporate the present invention, wherein the projection system combines light in each color channel to form a combined color image beam that is projected to a screen using a single projection lens unit.

In some other embodiments, the differently colored image light beams may be combined with each other into a single, full color image beam before being projected to the screen. Image light beams may be combined using, for example, dichroic optical combining elements such as an x-cube dichroic combiner or other types of dichroic combiner including a Philips color prism and a series of dichroic mirrors. In other approaches, light beams may be combined based on polarization. In the particular embodiment of projection system 200 schematically illustrated in FIG. 2, the colored image light beams 108a, 108b, 108c are combined in an x-cube color combiner 214 to form a single, full color image beam 216 that is projected to the screen 112 using a single projection lens unit 210.

Also shown is an image controller 220, coupled to the image-forming devices 104a, 104b. The image controller 220 produces a control signal that is applied to the image-forming devices that controls the image imposed by the image-forming devices on the incident illumination light. The image controller 220 may also be coupled to the third image-forming device 104c, but this connection is omitted from the figure for the sake of clarity. The controller 220 may be operatively connected to receive signals from an image analysis unit 222 which, in turn, receives an input signal 224 from an external source. The input signal 224 may be, for example, a signal into a television set from a cable connection, a satellite receiver, a DVD player or a video tape player. The image analysis unit 222 converts the input signal into an image signal that is recognized by the controller 220.

A power supply 226 may be connected to provide power to the light sources 102a-c. The figure shows only the connection to the third light source 102c for clarity.

Figure 3:
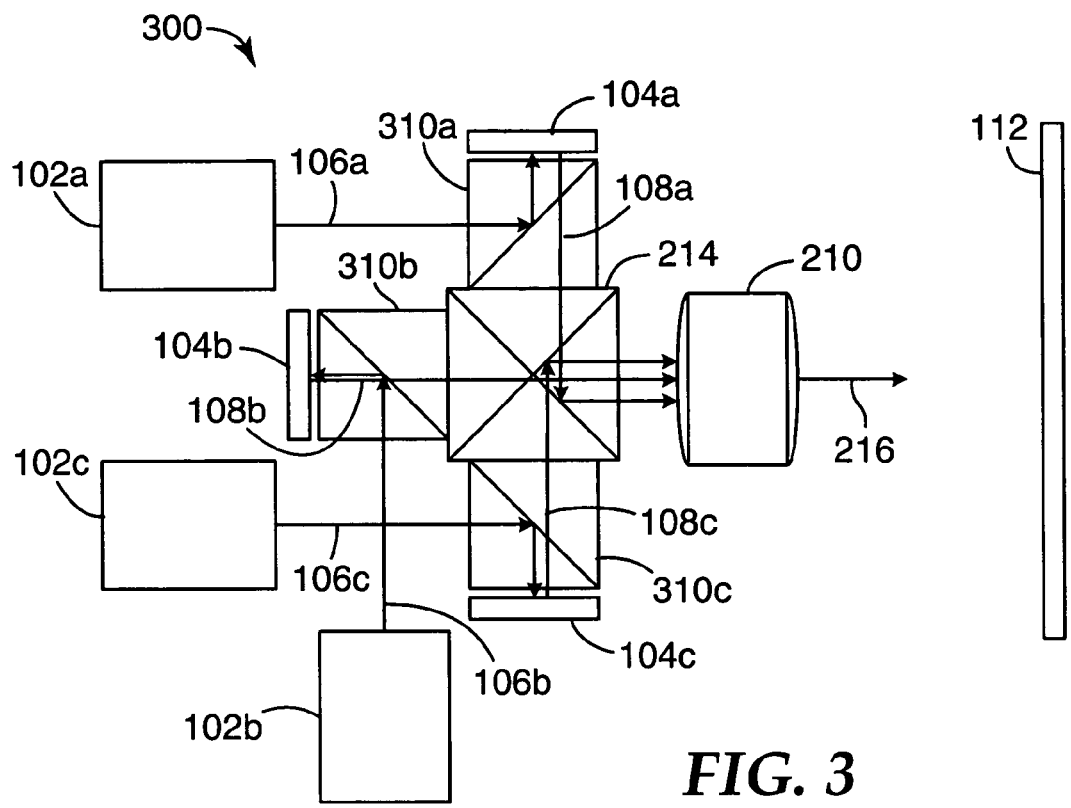
FIG. 3 schematically illustrates a projection system that may incorporate the present invention, wherein the projection system uses reflecting image-forming devices and combines light in each color channel to form a combined color image beam that is projected to a screen using a single projection lens unit.

Another exemplary embodiment of a multi-panel projection system 300, that may incorporate the invention, is schematically illustrated in FIG. 3. In this particular embodiment, the projection system 300 is a three-panel projection system, having light sources 102a, 102b, 102c that generate differently colored illumination light beams 106a, 106b, 106c, for example red, green and blue. The light sources 102a, 102b, 102c may include beam steering elements, for example mirrors or prisms, to steer any of the colored illumination light beams 106a, 106b, 106c to their respective image-forming devices 104a, 104b, 104c. The light sources 102a, 102b, 102c may also include various elements such as polarizers, integrators, lenses, mirrors and the like for dressing the illumination light beams 106a, 106b, 106c.

The colored illumination light beams 106a, 106b, 106c are directed to their respective image forming devices 104a, 104b and 104c via respective polarizing beamsplitters (PBSs) 310a, 310b and 310c. The image-forming devices 104a, 104b and 104c polarization modulate the incident illumination light beams 106a, 106b and 106c so that the respective, reflected, colored image light beams 108a, 108b and 108c are separated by the PBSs 310a, 310b and 310c and pass to the color combiner unit 214. The colored image light beams 108a, 108b and 108c may be combined into a single, full color image beam 216 that is projected by a projection lens unit 210 to the screen 112.

In the illustrated exemplary embodiment, the colored illumination light beams 106a, 106b, 106c are reflected by the PBSs 310a, 310b and 310c to the image-forming devices 104a, 104b and 104c and the resulting image light beams 108a, 108b and 108c are transmitted through the PBSs 310a, 310b and 310c. In another approach, not illustrated, the illumination light may be transmitted through the PBSs to the image-forming devices, while the image light is reflected by the PBSs.

Other embodiments of projection system may use a different number of image-forming devices, either a greater or smaller number. Some embodiments of projection systems use a single image-forming device while other embodiments employ two image-forming devices. For example, projection systems using a single image-forming device are discussed in more detail in co-owned U.S. patent application Ser. No. 10/895,705 and projection systems using two image-forming devices are described in co-owned U.S. patent application Ser. No. 10/914,596, both of which are incorporated herein by reference. In a single panel projection system, the illumination light is incident on only a single image-forming panel. The incident light is modulated, so that light of only one color is incident on a part of the image-forming device at any one time. As time progresses, the color of the light incident on the image-forming device changes, for example, from red to green to blue and back to red, at which point the cycle repeats. This is often referred to as a "field sequential color" mode of operation. In other types of single panel projection systems, differently colored bands of light may be scrolled across the single panel, so that the panel is illuminated by the illumination system with more than one color at any one time, although any particular point on the panel is instantaneously illuminated with only a single color.

In a two-panel projection system, two colors, for example red and blue, are directed sequentially to a first image-forming device panel that sequentially displays images for red and blue light. The second panel, for example for the green color channel, may be illuminated continuously. The image beams from the green image-forming device and from the red/blue image-forming device are combined and projected: due to integration in the eye, the viewer sees a full color image.

There are many different arrangements for light emitting elements, such as LEDs, in light sources used to generate the different colored illumination beams used to illuminate the image-forming panel(s) of a projection system. In many embodiments, the light sources employ multiple light emitting elements arranged in an array. In some embodiments, light from different light emitting elements are combined using refractive optics, reflective optics or a combination of refractive and reflective optics. Also, in some embodiments, light from the light emitting elements may be directed through an integrating tunnel to produce an illumination light beam, having a uniform intensity, that is directed to the image-forming device. In other embodiments, illumination light may be directed to the image-forming device without passing through an integrator.

Figure 4:
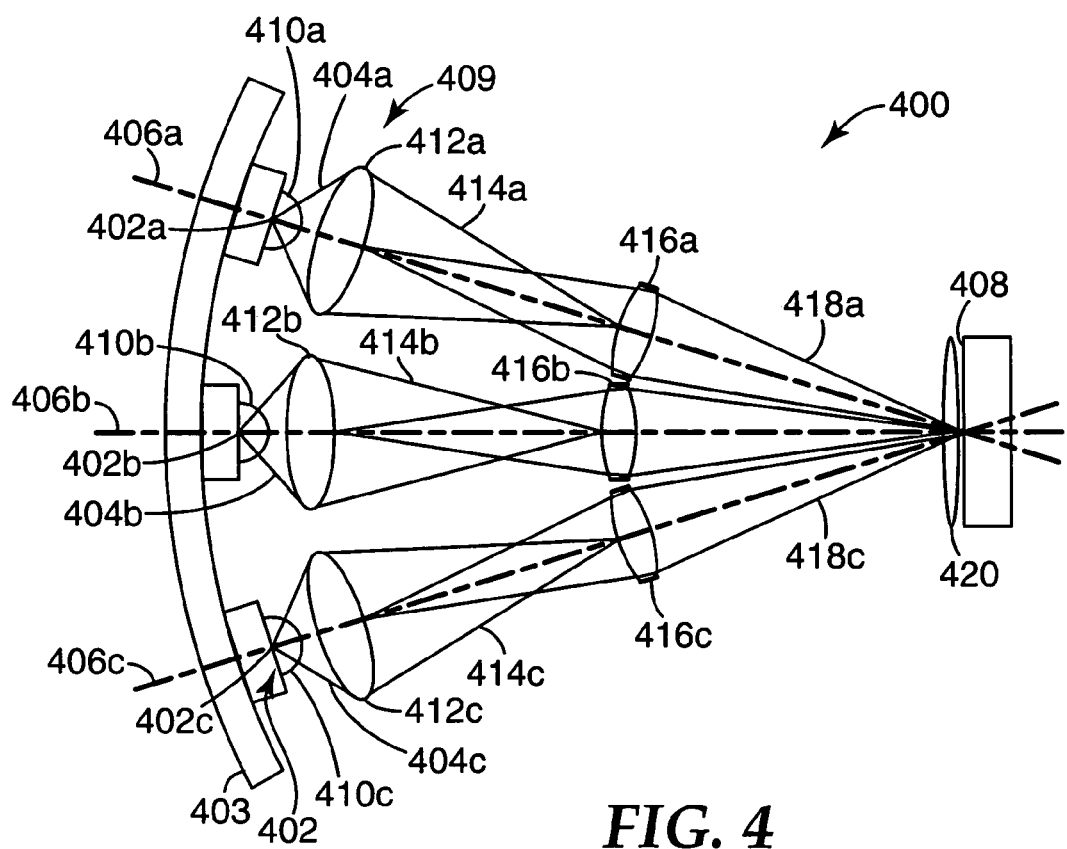
FIGS. 4 and 5 schematically illustrate embodiments of part of a light illumination system that may incorporate the present invention, the illumination system using an array of LEDs to generate light that is directed to a target area.

One particular embodiment of a light source 400 that uses an array of light emitting elements 402 for generating an illumination light beam for one color channel is schematically illustrated in FIG. 4. In this exemplary embodiment, the light source 400 is shown with three light emitting elements 402. The light emitting elements 402 may be, for example, LEDs. Different numbers of light emitting elements 402 may be used. For example, the light source 400 could include a 3×3 array of light emitting elements 402. The light source 400 is described in greater detail in co-owned U.S. patent application Ser. No. 10/923,945, incorporated herein by reference.

Light emitting elements 402a, 402b and 402c are arranged to emit illumination light 404a, 404b, 404c along respective axes 406a, 406b and 406c towards a target area 408. The light emitting elements 402a, 402b and 402c may be mounted to a curved base 403. The axes 406a, 406b and 406c need not be parallel to each other and, in this exemplary embodiment, are preferably directed so as to intersect at the center of the target area 408. The target area 408 may correspond to the location of an image-forming device or to some other target aperture, for example the input to a tunnel integrator. There may be further optical elements positioned between the light emitting elements 402a, 402b and 402c and the target area 408, in addition to those shown in FIG. 4, such as beam steering optics and polarizing optics. Such further optical elements are omitted from the drawings for clarity.

Light collection units 409, comprising one or more lenses, are used to collect the light 404a, 404b, 404c from each light emitting element 402a, 402b and 402c. The light collection units 409 may include, for example, lenses 410a, 410b and 410c associated with respective light emitting elements 402a, 402b, 402c. For example, where the light emitting elements 402a, 402b and 402c are LEDs, the associated lenses 410a, 410b and 410c may be hemispherical lenses formed of a material encapsulating the LEDs. In the illustrated embodiment, the light collection units 409 also include condenser lenses 412a, 412b, 412c. The light emitting element 402a has an associated lens 410a and a condenser lens 412a to collect the emitted light 404a. The collected light 414a is directed primarily along the axis 406a towards an imaging lens unit 416a. The imaging lens unit 416a is positioned between the target area 408 and the condenser lens 412a so as to relay an image of the condenser lens 412a to proximate the target area 408. The image of the condenser lens 412a may be somewhat defocused at the target area 408. An image of the light generating element 402a may also be formed at the imaging lens unit 416a by the light collection optics 409.

The imaging lens unit 416a may comprise a single lens or may comprise two or more lenses. The imaging lens unit 416a is positioned symmetrically or non-symmetrically along the axis 406a between the light collecting unit 409 and the target area 408. The position of the imaging lens unit 416a between the light-collecting unit 409 and the target area 408 is dependent on the particular optical design selected for the illumination system.

Where the intensity profile of the light 404a at the condenser lens 412a is relatively uniform, the resulting image of the condenser lens 412a formed at the target area 408 is also relatively uniform. For example, where the light source 402a is an LED, the quasi-Lambertian nature of the emitted light 404a results in relatively uniform illumination of the condenser lens 412a, and so illumination of the target area 408 by light 418a from the imaging lens unit 416a is also relatively uniform.

The other light emitting elements 402b and 402c each have respective light collecting lenses 410b, 412b and 410c, 412c that direct the emitted light beams 404b and 404c towards the respective imaging lens units 416b and 416c. The imaging lens units 416b and 416c relay images of the output from the light collection optics, in other words images of the condenser lenses 412b and 412c, to the target area 408. The images of the condenser lenses 412a, 412b and 412c overlap at the target area 408 and substantially fill, or may even slightly even overfill, the target area 408.

The relayed light 418 a and 418 c propagates generally along the axes 406a and 406c respectively. The axes 406a and 406c are tilted around the axis of the target area 408: in the illustrated embodiment, the axis of the target area is coincident with the axis 406b. Tilting of the axes 406a and 406c permits the relayed light 418 a and 418 c to fill the angular space available at the target area 408. In the exemplary embodiment illustrated in FIG. 4, the light collection units 409 are co-axial with the respective imaging lens unit 416, with the result that the light propagates along a respective axis 406a, 406b, 406c from the light emitting elements 402a, 402b, 402c to the target 408. The axes 406a, 406b, 406c may be positioned to pass through the center of the target area 408 and be oriented radially so as to accommodate the tangential dimensions of the optical elements associated with each illumination channel. This arrangement increases the intensity of the illumination light received at the target area 408. Accordingly, the light emitting elements 402a, 402b 402c may be mounted to a surface of the curved base 403 that is spherical, with a radius of curvature centered approximately at the center of the target 408.

A field lens 420 may be positioned between the target 408 and the imaging lens units 416 so that the relayed light 418a and 418c stays within the acceptance cone of the illumination system 400.

Figure 5:
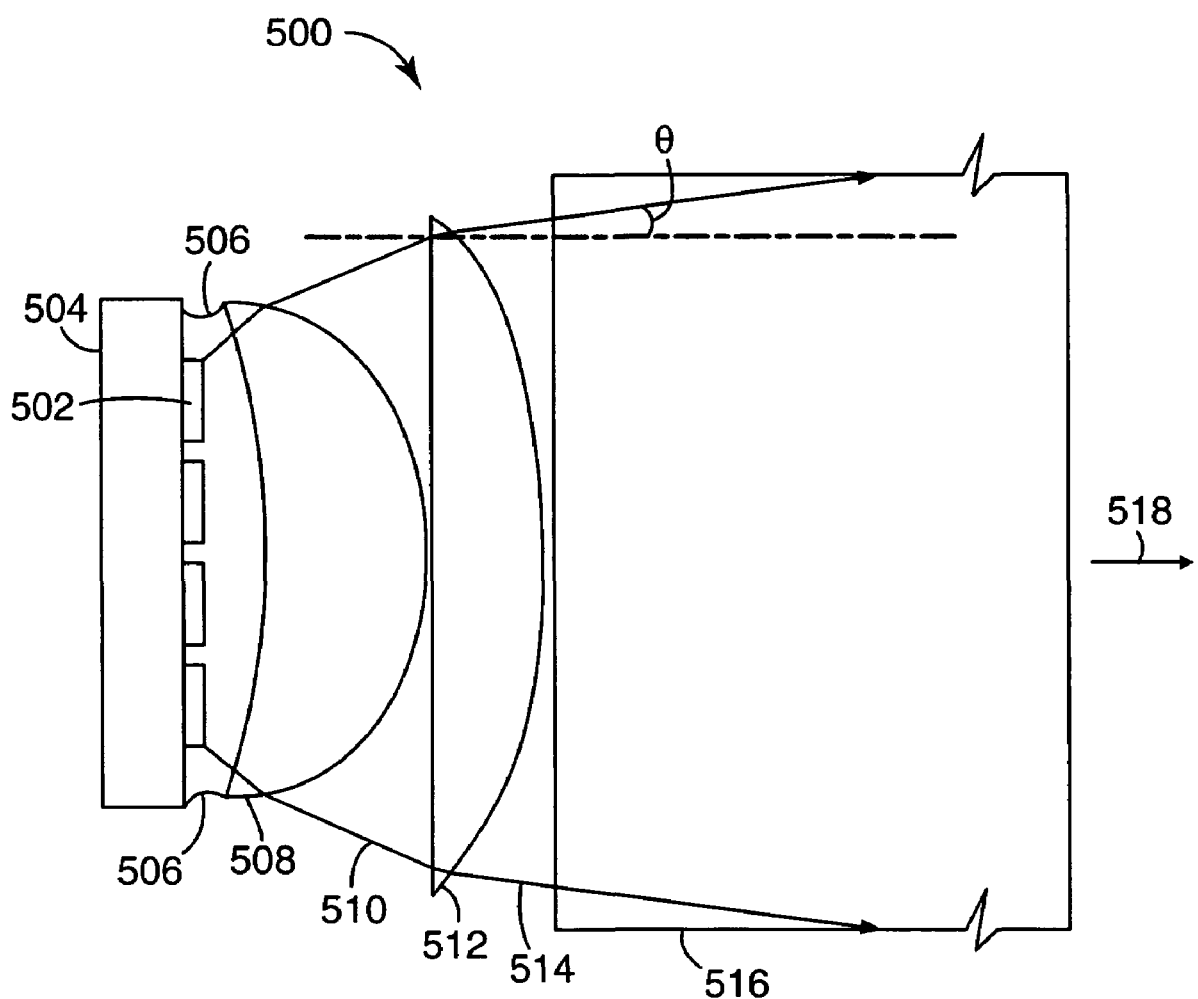

Another embodiment of a light source 500 that uses an array of light emitting elements 502 is schematically illustrated FIG. 5. In this exemplary embodiment, the light source 500 is shown in cross-section with four light emitting elements 502, although different numbers of light emitting elements 502 may be used. Also, the light emitting elements may be arranged in a two-dimensional array, extending out of the plane of the figure. For example, the light emitting elements 502 may be arranged in a 4×4 array. The light source 500 is described in greater detail in co-owned U.S. patent application Ser. No. 11/025,285, incorporated herein by reference.

The light source 500 incorporates a number of light emitting elements 502, for example LEDs, arranged on a submount 504. An encapsulant 506, for example an encapsulating gel, may be disposed over the light emitting elements 502. Examples of suitable encapsulants include cross-linkable, synthetic polymer fluids such as materials sold under product numbers LS-3252 and LS 3357 by Lightspan LLC, Wareham, Mass.

Light collecting optics may be used to reduce the divergence of the light from the light emitting elements 502. In the illustrated embodiment, the light collecting optics includes first and second lenses 508, 512. The first lens 508 is positioned over the light emitting elements 502 to reduce the divergence of the light 510 emitted by the light emitting elements 502. Reflective losses arising at the interface between the encapsulant 506 and the first lens 508 may be reduced by avoiding air gaps. The first lens 508 may be adhered by the encapsulant 506. The first lens 508 may be spherical or aspherical, and may be a molded lens. The second lens 512 further reduces the divergence of the light 510 from the light emitting elements 502 to produce substantially telecentric light 514 that enters the tunnel integrator 516. The half angle of divergence, $\theta$, of the telecentric light 514 may be, in some embodiments, around 20° or less. The light exits the tunnel integrator 516 as a uniformly bright output beam 518, suitable for illuminating the image-forming device of a projection display system.

Additional embodiments of light sources that use different arrangements of multiple LEDs for illuminating an image-forming device are discussed in U.S. patent application Ser. Nos. 11/025,285, and 10/923,945 incorporated herein by reference.

LED-based illumination systems proposed or used for illuminating an image-forming device have included separate optical paths for the different color channels. The color purity of these systems is dictated by the emitting spectra of the red, green and blue LEDs used respectively in the different red, green and blue light sources.

Figure 6:
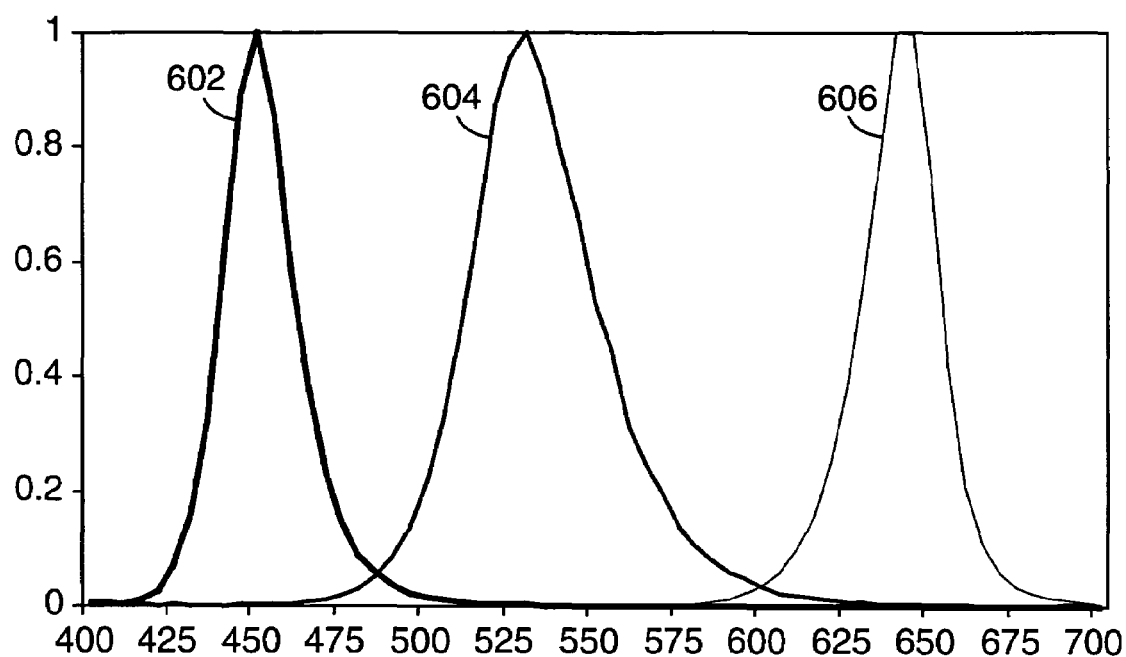
FIG. 6 shows a graph of the normalized output power as a function of wavelength for three different sample LEDs.

Some examples of the spectra of state-of-the-art LEDs currently available are provided in FIG. 6. Curve 602 represents the emission spectrum of Luxeon III Emitter, LXHL-PR09 (royal blue), curve 604 represents the emission spectrum of Luxeon III Emitter, LXHL-PM09 (green), and curve 606 represents the emission spectrum of Luxeon Emitter, LXHL-PD01(red), all available from Lumileds Inc, San Jose, Calif. The figure shows that the center, or peak, wavelength for the royal blue emitter (curve 602) is approximately 455 nm: this color is described by the manufacturer as royal blue (RB). It is intended that, in the following description, when an LED is described as producing blue light, the term "blue" includes "royal blue". The center wavelength for the green emitter is approximately 530 nm (curve 604), and for the red emitter (curve 606) is approximately 645 nm. These spectra correspond to the CIE 1931 (x, y) color coordinates presented below in Table I. The lower two rows of the table show the required (x, y) color coordinates for primary colors in accordance with Recommended Practice 145-1999, "C Color Monitor Colorimetry", published by the Society of Motion Picture and Television Engineers (SMPTE 145-1999). This document describes the preferred primary colors generated in television images. Data in the table show that the color purity of the particular LEDs listed above is significantly different from that set forth in SMPTE 145-1999.

TABLE I

Recommended color coordinates according to SMPTE 145-1999 and exemplary available LEDs

|  |  | Blue | Green | Red |
| --- | --- | --- | --- | --- |
| LED | x | 0.153 | 0.234 | 0.701 |
|  | y | 0.027 | 0.698 | 0.295 |
| SMPTE | x | 0.155 | 0.310 | 0.630 |
|  | y | 0.070 | 0.595 | 0.340 |

An illumination system that uses these LEDs, where the red light beam is generated only by red LEDs, the green beam is generated only by green LEDs and the blue beam is generated only by blue LEDs, is referred to here as an uncompensated system. Table II lists the required lumens in each color channel required to achieve white color coordinates of (0.300, 0.301).

TABLE II

Characteristics of uncompensated LED illumination system

|  |  | Channels | | | |
| --- | --- | --- | --- | --- | --- |
|  |  | Blue | Green | Red | White |
| LEDs | RB | 6.2 |  |  | 139.1 |
| (lumens) | G |  | 100 |  |  |
|  | R |  |  | 32.9 |  |
| x |  | 0.153 | 0.234 | 0.701 | 0.300 |
| y |  | 0.027 | 0.698 | 0.295 | 0.301 |

Thus, to achieve a white color having color co-ordinates of (0.300, 0.301), the amount of light in the blue, red and green beams is 6.2:32.9:100 lumens respectively. This corresponds to a total light output of 139.1 lumens. Thus, the green light source has to generate 100 lumens, compared to 32.9 lumens in the red light source, and 6.2 lumens in the blue light source, to achieve the desired white color. In this table, and in the following table, the numbers of lumens in each color channel are normalized to the green channel, the number of lumens in the green channel being set to 100. Thus, the number of lumens in the white light produced by this exemplary illumination system, calculated simply by adding together the numbers of lumens in each color channel, is equal to 139.1.

Figure 7:
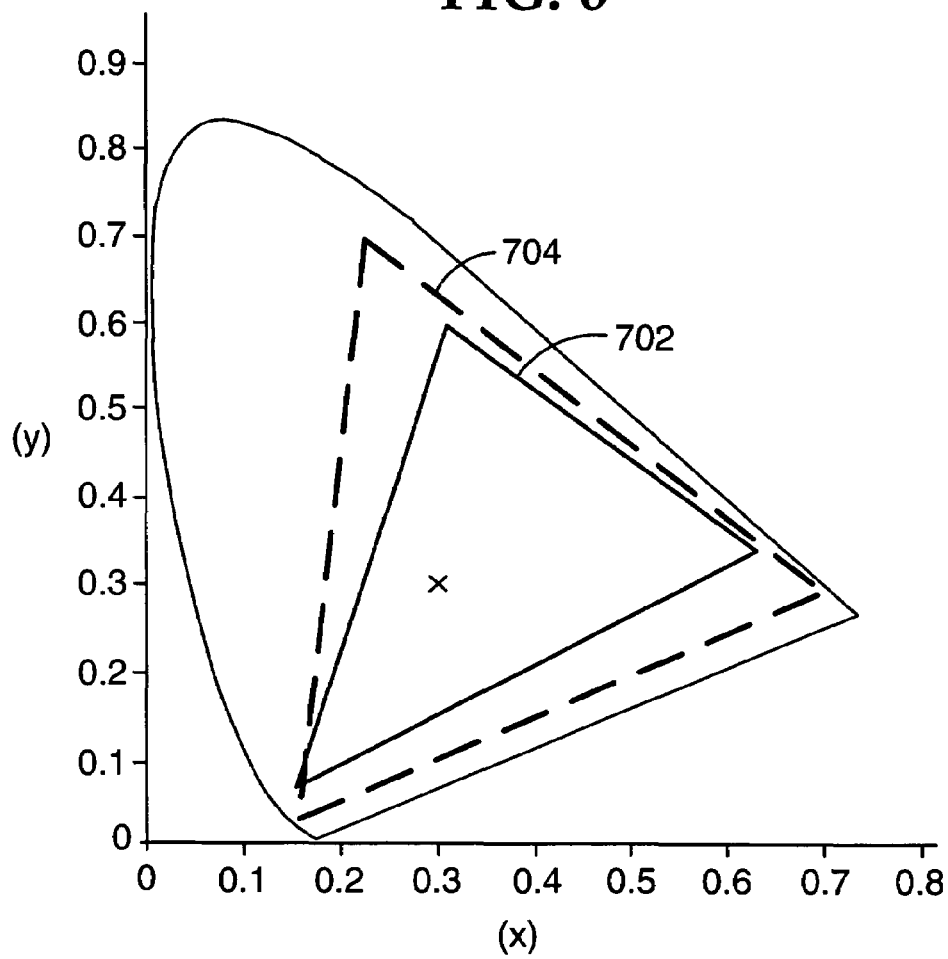
FIG. 7 presents a CIE 1931 color diagram illustrating a standard color gamut and the color gamut of an uncompensated illumination system.

Table II also shows the (x, y) coordinates for the CIE 1931 color chart, for such a light source. The resulting color gamut is shown in FIG. 7. The triangle 702, drawn in solid lines, represents the color gamut of the idealized SMPTE 145-1999 source, as listed in Table I. The triangle 704, drawn in dashed lines, represents the color gamut of the uncompensated LED illumination system. The "X" marks the white color coordinate.

The brightness of the uncompensated illumination system, however, is limited by the number of green LEDs: the green LEDs operate at 100% in the uncompensated system, while the red and blue LEDs operate at reduced power. Under some approaches, one might simply add green LEDs to the green illumination channel to make the system brighter, since the blue and red LEDs in the blue and red illumination channels have flux capacity to spare.

That is not the approach taken according to the present invention, however. As is shown in the following examples, the overall brightness of the illumination system may be increased without adding green LEDs to the green illumination channel, i.e. without adding more of the same type of LED to that channel that is already operating at maximum capacity. Instead, the brightness of the illumination system may be increased by adding non-blue LEDs, e.g. red and green LEDs, to the blue illumination channel and/or by adding non-red LEDs, e.g. green and blue LEDs, to the red illumination channel. Thus, the channels that operate below maximum capacity in the unaugmented system may be augmented to increase the brightness of the illumination system. This brightness increase is not dependent on adding LEDs to that channel operating at maximum capacity. In other words, the brightness of the system is increased by adding an LED of a first color, and perhaps a second color, to an illumination channel of a third color. This approach may be particularly useful when there is a maximum number of LEDs allowed in each channel, e.g., when there are heat management issues from crowding LEDs closely together, and/or étendue limitations of the LED sources and the projection optics receiving the light from the LED array.

According to some embodiments of the invention, an LED of one wavelength range, or color, may be added to an LED array that emits light primarily in another wavelength range, or color. For example, an array of red LEDs used to illuminate the red color channel, such as the LED arrays illustrated in FIGS. 4 and 5, may be augmented with one or more green LEDs and/or one or more blue LEDs. The numbers of green and blue LEDs used for augmenting the red channel depend on the how much green and blue light is needed for augmentation. The resulting red channel illumination beam contains relatively small amounts of blue and green light, and so the color of the red light illumination beam is changed, resulting in a change in the color gamut of the illumination system. Likewise, the array of blue LEDs used for illuminating the blue color channel may be augmented with green and/or red LEDs and the array of green LEDs used for illuminating the green color channel may be substituted with red and/or blue LEDs. This mixing of differently colored LEDs into the different color channels can result in changing the color gamut of the illumination system. Importantly, this change in color gamut can be realized without any cost in the brightness of the illumination light and, in fact, the total brightness of the illumination light may increase.

The following discussion describes how the color gamut can be changed while improving the brightness of the illumination system. While the invention may be used with different types of colored light emitting elements, the examples are explained in Tables III-VIII assume that the LEDs used in the illumination light source are those whose spectra are shown in FIG. 6.

Figure 8:
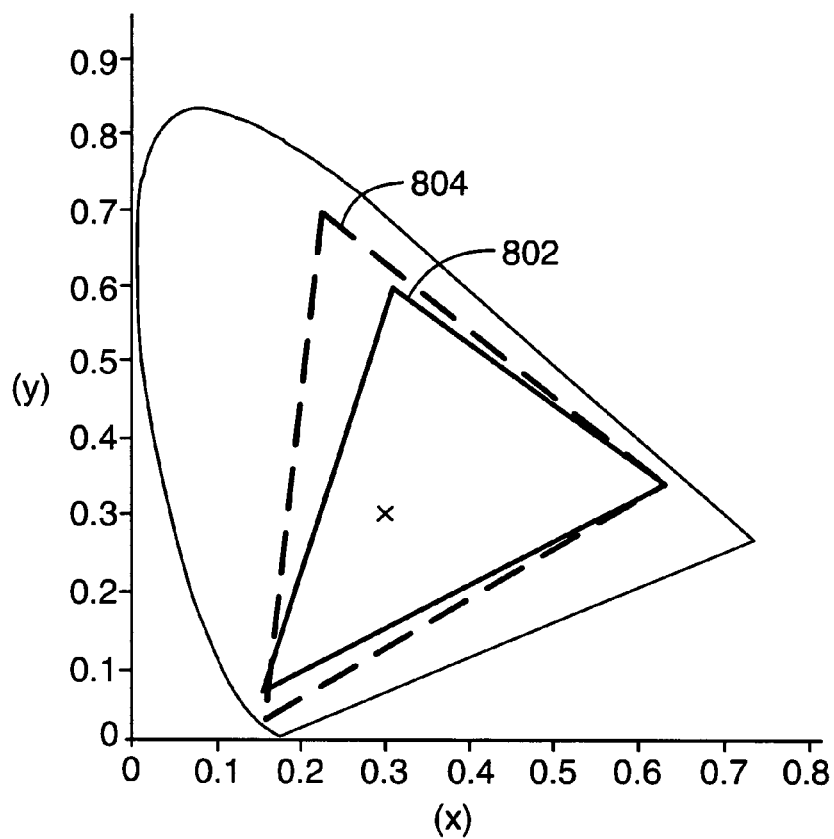
FIG. 8 presents a CIE 1931 color diagram illustrating a standard color gamut and the color gamut of an illumination system having a compensated illumination channel according to principles of the present invention.

First, an illumination source in which the red channel is augmented using green and blue LEDs is considered in Table III. The number of green LEDs added is sufficient to reach a value of 9.1 lumens in the red light channel, while the number of blue LEDs added is sufficient to reach a value of 0.2 lumens in the red channel. The red LEDs in the augmented red channel require a different intensity of light from the red LEDs to achieve the same white spectrum. In this circumstance, the red LEDS are driven harder, but still within the manufacturer's specification, to produce 35.2 lumens, instead of just 32.9 lumens as in the uncompensated illumination system. Consequently, the (x, y) coordinates of the red channel are moved to (0.630, 0.340), which corresponds closely to the red coordinate of the SMPTE 145-1999 color gamut. The color gamuts are illustrated in FIG. 8: the triangle 802 shown in solid lines represents the SMPTE 145-1999 color gamut, while the triangle 804 shown in dashed lines shows the color gamut of the improved illumination system summarized in Table III. The "X" marks the position of the white light generated by the illumination system. Thus, the light from this exemplary illumination system more closely approximates the SMPTE 145-1999 color gamut than the uncompensated gamut illustrated in FIG. 7.

The numbers of lumens in each channel are normalized to the green channel, which has 100 lumens. Thus, according to this exemplary embodiment, the blue channel has 6.2 lumens and the red channel has 44.5 lumens. Thus, the total number of lumens in the white light produced by this illumination system, calculated by adding together the number of lumens in each channel, is 150.7. This is brighter than the white light produced by the exemplary uncompensated illumination system described in Table II by 11.6 lumens, or 8.3%, but the color of the white light is maintained.

TABLE III

Characteristics of the illumination system with improved red channel

|  |  | Channels |  |  |  |
|---|---|---|---|---|---|
|  |  | Blue | Green | Red | White |
| LEDs (lumens) | RB | 6.2 |  | 0.2 | 150.7 |
|  | G |  | 100 | 9.1 |  |
|  | R |  |  | 35.2 |  |
| total lum. |  | 6.2 | 100 | 44.5 | 150.7 |
| x |  | 0.153 | 0.234 | 0.630 | 0.301 |
| y |  | 0.027 | 0.698 | 0.340 | 0.301 |

Figure 9:
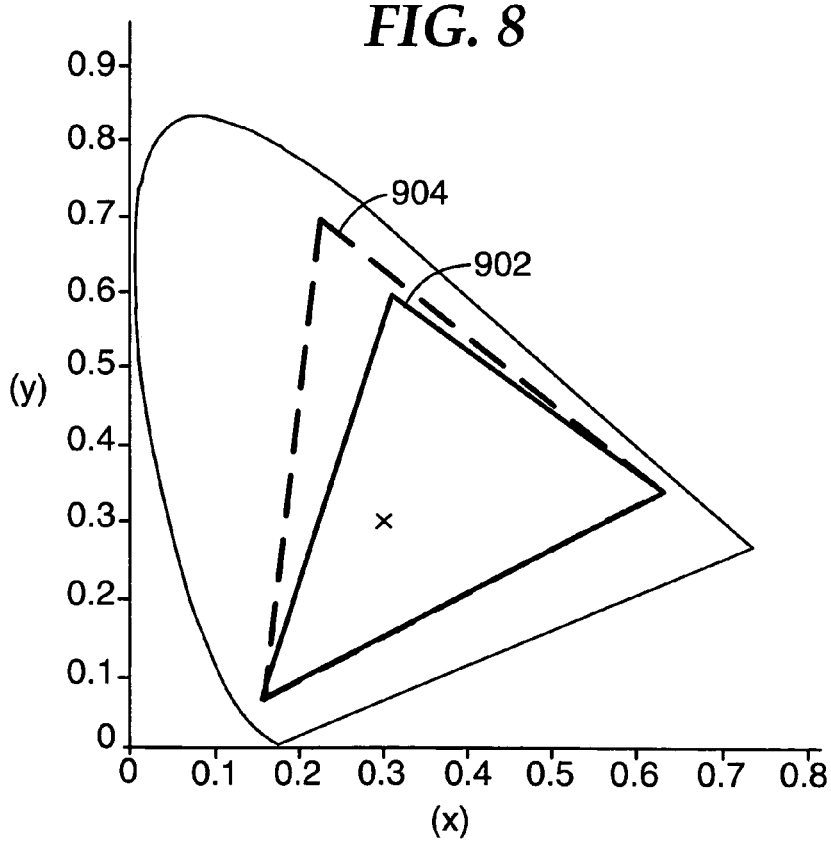
FIG. 9 presents a CIE 1931 color diagram illustrating a standard color gamut and the color gamut of an illumination system having two compensated illumination channels according to principles of the present invention.

In Table IV, it is assumed that, in addition to the red channel being augmented, the blue channel is also augmented, by adding some green and red light. In other words, the array of blue LEDs used for illuminating the blue channel is augmented with one or more green LEDs and one or more red LEDs. The number of green LEDs added is sufficient to reach a value of 7.8 lumens in the blue channel, while the number of red LEDs added is sufficient to reach a value of 0.3 lumens in the blue channel. Also, the blue LEDs in the blue channel are driven harder, producing 11.5 lumens, an increase of 5.3 lumens, to achieve the same white point. Consequently, the (x, y) coordinates of the blue channel are moved to (0.160, 0.071), which corresponds closely to the blue corner of the SMPTE 145-1999 color gamut. The color gamuts are illustrated in FIG. 9: the triangle 902 shown in solid lines represents the SMPTE 145-1999 color gamut, while the triangle 804 shown in dashed lines shows the color gamut of the improved illumination system summarized in Table IV. The "X" marks the position of the white light generated by the illumination system. Thus, the light from this exemplary illumination system more closely approximates the SMPTE 145-1999 color gamut than the uncompensated gamut illustrated in FIG. 7.

The numbers of lumens in each channel are normalized to the green channel, which has 100 lumens. Thus, according to this exemplary embodiment, the blue channel has 19.6 lumens. At the same time, the amount of light in the red channel may be increased to maintain the same white coordinate (0.301, 0.300). Thus, the red channel contains 50.2 lumens, with 0.2 lumens of blue light, 10.3 lumens of green light and 39.7 lumens of red light. Thus, the total number of lumens in the white light produced by this illumination system, calculated by adding together the number of lumens in each channel, is 169.8. This is brighter than the white light produced by the exemplary uncompensated illumination system described in Table II by 30.7 lumens, or about 22%. The same white color point (0.301, 0.300) is maintained.

TABLE IV

Characteristics of the illumination system with improved red and blue channels

|  |  | Channels |  |  |  |
|---|---|---|---|---|---|
|  |  | Blue | Green | Red | White |
| LEDs (lumens) | RB | 11.5 |  | 0.2 | 169.8 |
|  | G | 7.8 | 100 | 10.3 |  |
|  | R | 0.3 |  | 39.7 |  |
| total lum. |  | 19.6 | 100 | 50.2 | 169.8 |
| x |  | 0.160 | 0.234 | 0.630 | 0.301 |
| y |  | 0.071 | 0.698 | 0.340 | 0.300 |

In Table V, it is assumed that, in addition to the red and blue channels being improved, the green channel is also improved, by adding some blue and red light. In other words, the array of green LEDs is substituted with one or more red LEDs and one or more blue LEDs. The number of blue LEDs added is sufficient to reach a value of 0.4 lumens in the green light channel, while the number of red LEDs added is sufficient to reach a value of 9.7 lumens in the green light channel. Since the system is normalized to the green channel having 100 lumens, the green LEDs in the green light channel produce 89.8 lumens. Thus, the color coordinate of the green channel becomes (0.307, 0.606), which is very close to the green point of the SMPTE 145-1999 color gamut.

Figure 10:
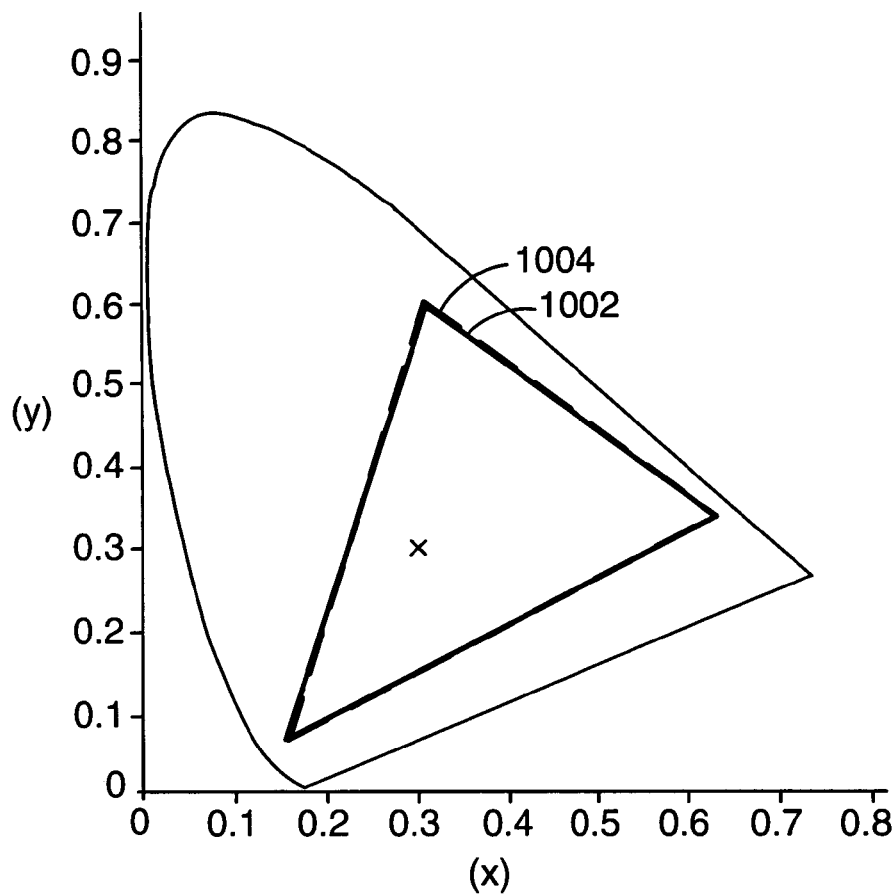
FIG. 10 presents a CIE 1931 color diagram illustrating a standard color gamut and the color gamut of an illumination system having three illumination channels compensated according to principles of the present invention.

The amount of light in the blue and red channels also needs to be adjusted from the values shown in Table IV, in order to maintain the same white point coordinate (0.301, 0.300). Thus, the blue light channel contains 9.9 lumens of blue light, 6.7 lumens of green light and 0.2 lumens of red light, for a total of 16.8 lumens in the blue channel. The red light channel contains 0.1 lumens of blue light, 6.8 lumens of green light and 26.3 lumens of red light, for a total of 33.2 lumens in the red channel. The coordinates of the red and blue points on the CIE 1931 chart are maintained. The color gamuts are illustrated in FIG. 10: the triangle 1002, shown in solid lines, represents the SMPTE 145-1999 color gamut, while the triangle 1004, shown in dashed lines, shows the color gamut of the improved illumination system summarized in Table V.

The color gamuts 1002, 1004 are substantially overlapping. The "X" marks the position of the white light generated by the compensated illumination system. Thus, the range of colors obtainable from this exemplary illumination system more closely approximates the SMPTE 145-1999 color gamut than the compensated gamut illustrated in FIG. 9.

The numbers of lumens in each channel are normalized to the green channel, which has 100 lumens. Thus, the total number of lumens in the white light produced by this illumination system, calculated by adding together the number of lumens in each channel, is 150.0. This is brighter than the white light produced by the exemplary uncompensated illumination system described in Table II by 10.9 lumens, or about 8%. The white color (0.301, 0.300), however, has been maintained.

TABLE V

Characteristics of the illumination system with all three channels improved

|  |  | Channels |  |  |  |
|---|---|---|---|---|---|
|  |  | Blue | Green | Red | White |
| LEDs | RB | 9.9 | 0.4 | 0.1 | 150.0 |
| (lumens) | G | 6.7 | 89.8 | 6.8 |  |
|  | R | 0.2 | 9.7 | 26.3 |  |
| total lum. |  | 16.8 | 100 | 33.2 | 150.0 |
| x |  | 0.160 | 0.307 | 0.630 | 0.301 |
| y |  | 0.071 | 0.606 | 0.340 | 0.300 |

Table VI shows a summary of the results presented in Tables II-V.

TABLE VI

Summary of achieved results

| System characterization | Relative lumens | Brightness improvement |
|---|---|---|
| Non-compensated | 139.1 | 100% |
| Improved R | 150.7 | 108% |
| Improved R and B | 169.7 | 122% |
| Improved R and B and G | 150 | 108% |

Thus, it is possible to produce an illumination system that is brighter, and that produces a color gamut that is closer to that recommended in SMPTE 145-1999, than an uncompensated illumination system in which each colored channel contains LEDs of only that respective color.

EXAMPLE 1

Figure 11:
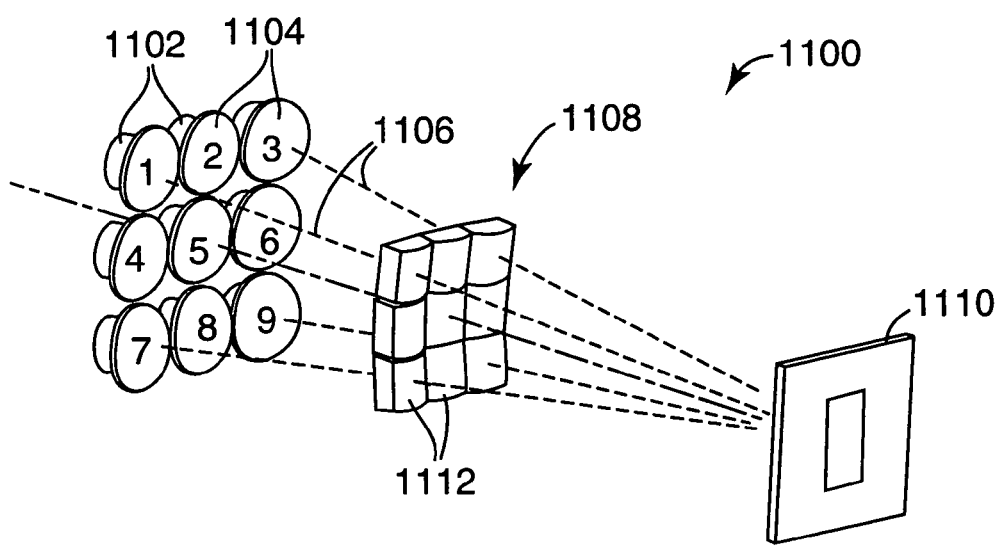
FIG. 11 schematically illustrates an exemplary illumination channel for an illumination system, according to principles of the present invention

To illustrate how this technique may be applied to practical illumination systems, an example is considered based on a three channel illumination system, where each channel is configured like that described above with respect to FIG. 4. A single channel 1100 of the illumination system is schematically illustrated in FIG. 11. A three-color projection system would include three such channels, e.g. for the red, green and blue channels. An array of LEDs 1102 each has a first lens group 1104, comprising at least one lens, to reduce the divergence of the light 1106 emitted from each LED 1102. The array of LEDs 1102 is illustrated to contain nine LEDs 1102, in positions labeled 1-9. A second lens group 1108, which may also comprise one or more lenses, focuses the light 1106 to the target area 1110. In the illustrated embodiment, the second lens group includes an array of lenslets 1112 associated with respective light beams 1106. This arrangement delivers light from each LED 1102 uniformly across the target area 1110. Thus, substituting an LED 1102 of one color for another color does not cause any significant color shift or color non-uniformity across the target area 1110.

The geometrical collection efficiency (GCE) can be calculated for various combinations of different LEDs and lenses in the illumination channel 1100. The GCE is that fraction of the light emitted by an LED that is incident at the target area within a restricted angular space. In one particular embodiment of illumination channel, discussed with regard to FIGS. 3C and 3D in U.S. patent application Ser. No. 10/923,945, the target area is the 15.5 mm×8.75 mm area of an image-forming device having a 16:9 aspect ratio. The GCE was calculated for each LED position, 1-9, for light within an f/2.3 acceptance cone. The resultant values of GCE are listed in Table VII for the different positions. Thus, 17.3% of the light from the LED 1102 at position 1 is incident at the target, 32.8% of the light from the LED at position 2 is incident at the target, and so on. As is seen, the GCE is highest for position 5, the central position, is lower for those adjacent positions closest to the center, positions 2, 4, 6 and 8, and is lowest for the corner positions, 1, 3, 7 and 9, farthest from the central position.

TABLE VII

GCE for different LED positions for multi-LED array of FIG. 11

|  | Position |  |  |  |  |  |  |  |  |
|---|---|---|---|---|---|---|---|---|---|
|  | 1 | 2 | 3 | 4 | 5 | 6 | 7 | 8 | 9 |
| GCE | 0.173 | 0.328 | 0.173 | 0.329 | 0.366 | 0.329 | 0.173 | 0.328 | 0.173 |

The GCE may be an important parameter when using LEDs of different colors in the same array. If it is important that an LED provide a relatively large fraction of light in the color channel, then it may be located at one of the positions of higher GCE. If, on the other hand, a particular LED provides a relatively smaller fraction of light in the color channel, then it may be located at one of the positions of lower GCE.

The performance of a compensated three-channel illumination system is dependent on the LEDs used in the different red, green and blue channels. In this example, the following three types of LEDs, all available from Lumileds Inc., San Jose, Calif., are assumed:

1. Red: LXHL-PD01, 44 lumens.
2. Green: LXHL-PM09, 95 lumens.
3. Blue: LXHL-PR09, 21 lumens.

The value of lumens provided in the list above corresponds to the measured lumens output for a single LED device.

The left half of Table VIII shows the calculated performance of an uncompensated illumination system in which the red, green and blue channels contain only red, green and blue LEDs respectively. The right half of Table VIII shows the calculated performance of a compensated illumination system where the red and the blue channels are compensated.

TABLE VIII

Implementation of color compensating technique

| | Illumination system with compensated | | | | | Uncompensated illumination system red and blue channels | | | |
|---|---|---|---|---|---|---|---|---|---|
| channel | LEDs position | | Total available lumens | Lumens used to achieve good white point | Percentage of used flux | LEDs position | | Total available lumens | Available lumens with good color purity | Percentage of used flux |
| Red | R | 1-9 | 104.4 | 74.1 | 71% | R | 1, 4-9 | 82.3 | 82.3 | 100% |
| | G | — | | | | G | 2 | 31.3 | 21.2 | 68% |
| | RB | — | | | | RB | 3 | 3.6 | 0.4 | 11% |
| Green | R | — | | | | R | — | | | |
| | G | 1-9 | 225.3 | 225.3 | 100% | G | 1-9 | 225.3 | 207.3 | 92% |
| | RB | — | | | | RB | — | | | |
| Blue | R | — | | | | R | 1 | 7.6 | 0.5 | 7% |
| | G | — | | | | G | 8 | 31.2 | 16.1 | 52% |
| | RB | 1-9 | 49.8 | 14.0 | 28% | RB | 2-7, 9 | 39.3 | 23.8 | 61% |
| Flux from illumination system (lumens) | | | | 313.4 | | | | | 351.6 | |

Considering first the uncompensated illumination system, whose performance is summarized in the left side of Table VIII, the red channel contains only red LEDs, filling positions 1-9 of the red channel array. Once the GCE is taken into account, the total available light flux available at the target is 104.4 lumens. The green channel contains only green LEDs, at positions 1-9 of the green channel array. When the GCE is taken into account, the total available green flux is 225.3 lumens. The blue channel contains only blue LEDs, at positions 1-9 of the blue channel array. When the GCE is taken into account, the total available blue flux is 49.8 lumens. To achieve the correct white coordinate, however, the red and blue channels are not operated at full power, and are operated at reduced levels. When the red channel array is operated at 74.1 lumens and the blue channel array is operated at 14 lumens, then the ratios of fluxes in the different channels are the same as those shown in Table II to achieve a white point of (0.301, 0.300), i.e. 74.1/225.3=32.9 and 14.0/225.3=6.2. Thus, the total flux produced by this illumination system for a white color with coordinate (0.301, 0.300) is 313.4 lumens (=74.1+225.3+14). This color requires that the blue channel is run at 28% of its possible output flux and the red channel is run at 71% of its possible output flux. This represents the best possible performance for a system with up to nine LEDs of the same color in each color channel.

The exemplary compensated illumination system is summarized in the right half of Table VIII. In this exemplary illumination system, the red and blue channels are compensated, corresponding to a situation like that discussed above with reference to Table IV. The red channel array includes red LEDs at positions 1 and 4-9 in the array, a green LED at position 2 and a blue LED at position 3. In this embodiment, the green and blue LEDs are located at the positions associated with lower values of GCE than the maximum value. In particular, the green LED is located at a position (position 2) where the GCE is 0.328 and the blue LED is located at a position (position 3) where the GCE is 0.173.

The red LEDs in the red channel array are operated at 100% power levels, the green LED is operated at 68% power and the blue LED at 11% power. This particular mixture of power levels results in the red channel illumination beam having the (x, y) coordinates listed in Table IV, i.e. (0.630, 0.340).

The blue channel array includes blue LEDs located at positions 2-7 and 9, a green LED at position 8 and a red LED at position 1. The blue LEDs in the blue channel array are operated at 61%, the green LED is operated at 52% and the red LED is operated at 7%. This particular combination of power levels results in the blue channel illumination beam having the (x, y) coordinates listed in Table IV, i.e. (0.160, 0.071).

The green channel array includes only green LEDs, operating at 92%. Thus, the coordinates of the green channel illumination beam are (0.234, 0.698).

The resulting white color coordinate, obtained when the light in the green, red and blue channels is combined, is (0.301, 0.300). Also, the maximum white light flux is 351.6 lumens, an increase of 12% over the white light flux possible from the uncompensated illumination system.

Some of the flux levels listed in Table VIII for achieving a good white point might be produced using an LED array for a particular channel that contains less than nine LEDs. For example, in the uncompensated illumination system, the number of blue lumens required to achieve a good white point, 14 lumens, may be produced using only two blue LEDs, at positions 5 and 6. Also, in the compensated illumination system, the number of blue LEDs required to achieve 25.8 lumens may be achieved using only four blue LEDS at positions 2, 4, 5 and 6.

It is noted that, for at least this embodiment, and some of the other exemplary embodiments discussed below, the light source includes at least one channel where there are LEDs emitting at different wavelengths, and one of the wavelengths is closer to the wavelength emitted by an LED in another channel. For example, with regard to the example summarized in Table VIII, the blue channel includes an LED emitting green light. Thus, the green LED in the blue channel emits light having a wavelength closer to the wavelength of the green LEDs in the green channel than the wavelength of the blue LEDs in the blue channel.

EXAMPLE 2

This second example describes the brightness improvement that may be gained by augmenting two color channels in a three panel system in which the differently colored image beams are combined in a dichroic combiner. The exemplary projection system is assumed to be similar to that schematically illustrated in FIG. 3, in which red, green and blue image beams are combined in a dichroic combiner such as an x-cube combiner 214. In this particular example, the green image light beam is the beam 108b that is transmitted through the color combiner 214, and the red and blue beams are reflected by the combiner 214.

The measured throughput for light in each color channel was measured for a typical x-cube dichroic combiner, for example as is available from Keting Optical Technology Inc., Hangzhou, P.R.C., and from Prodisc Technology Inc., Taipei Hsein, Taiwan. The term "throughput" in this situation means the fraction of light incident at the combiner 214 in a certain color channel that is emitted from the comber in the single-color, combined image beam 216. Thus, the green channel was transmitted through the comber 214 and the red and blue channels were reflected within the combiner 214. A white light source, emitting light having a known spectrum and in an f/1.8 beam, was used as the light source. The collected data were corrected for variations in power across the visible spectrum.

Figure 12:
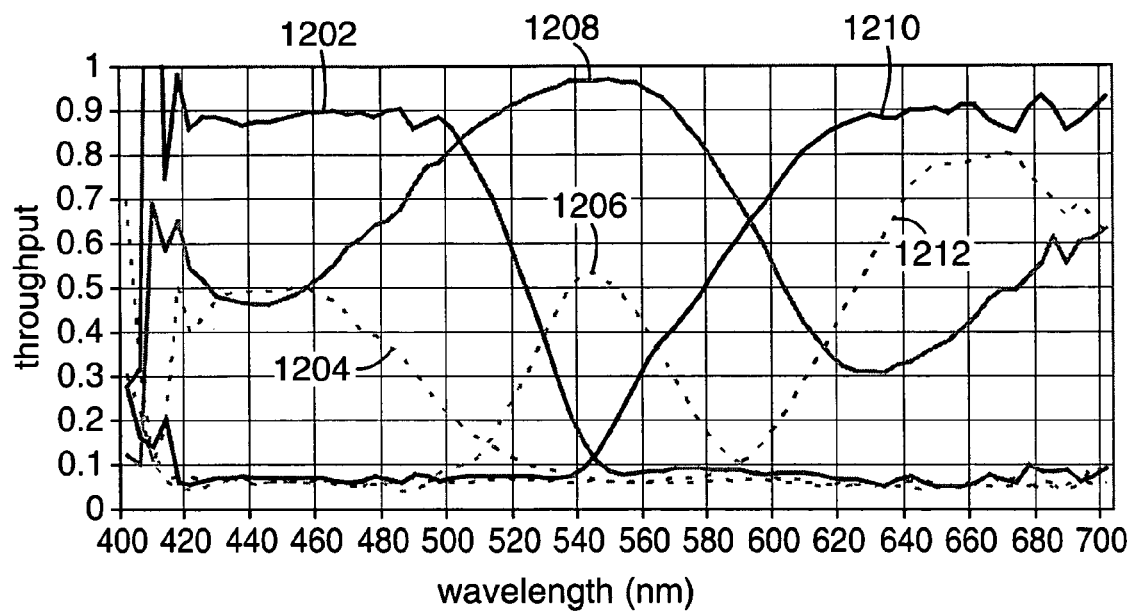
FIG. 12 presents a graph showing the measured amount of light put through different color channels of an x-cube color combiner as a function of wavelength and polarization.

A graph showing the measured throughput for s-polarized light and p-polarized light in each color channel is shown in FIG. 12. Curves 1202 and 1204 respectively show the throughput for s-polarized and p-polarized light in the blue channel. Curves 1206 and 1208 respectively show the throughput for s-polarized and p-polarized light in the green channel and curves 1210 and 1212 respectively show the throughput for light in the red channel. Throughput is highest for s-polarized light in the red and blue channels and for p-polarized light in the green channel. The throughput of the blue channel is minimal for light having a wavelength above about 550 nm whereas the throughput of the red channel is minimal for light having a wavelength less than about 540 nm. The green channel transmits no less than 30% of the incident light across the visible spectrum. Thus, when this particular combiner is used, the throughput of any red light in the blue channel will be minimal and, likewise, the throughput of any blue light in the red channel will be minimal. This suggests the use of a compensation scheme, different from that described in Example 1 above, in which the only LEDs added to augment a particular channel are associated with an adjacent color band, i.e. only green light is used to augment the red and blue channels.

For this example, the characteristics of the LEDS used in the illumination source are summarized in Table IX below.

TABLE IX

LED characteristics for Example 2

| | Color | | |
|---|---|---|---|
| | RB | G | R |
| Flux from one LED (lm) | 18 | 96 | 47 |
| Size of LED emitting area (mm$^2$) | 0.96 | 0.96 | 0.85 |
| Portion of the flux coming from emitting area | 0.86 | 0.82 | 0.57 |
| Flux available from one LED (lm) | 15.5 | 78.7 | 26.8 |

The red, green and blue LEDs assumed in Table IX are the same as discussed above in Example 1. The performance of an illumination system using only red, green and blue LEDs in the respective red, green and blue channels is summarized in Table X.

Figure 13A:
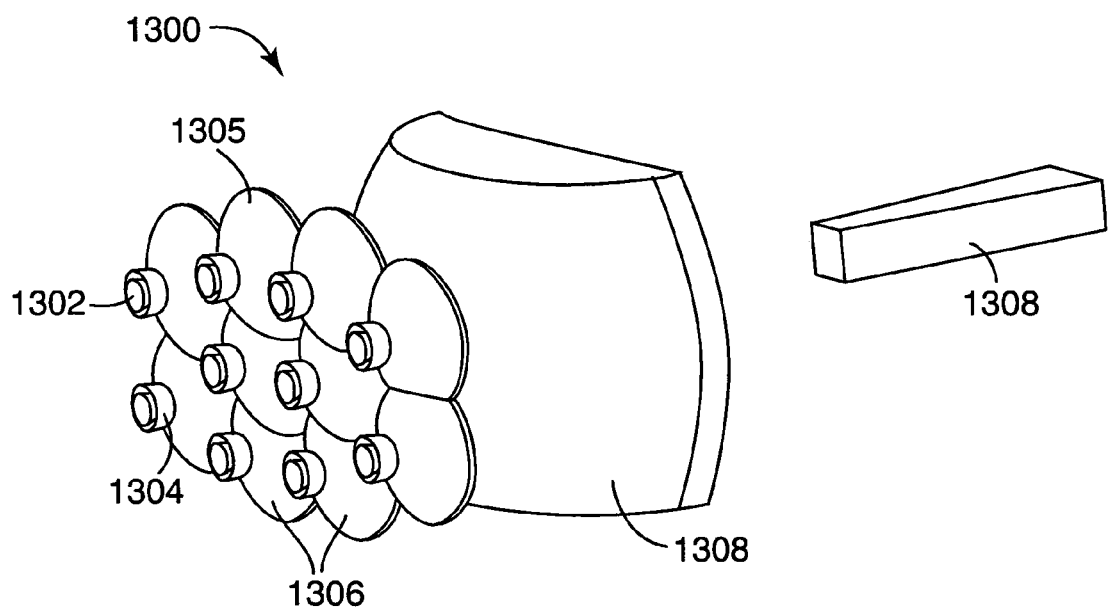
FIGS. 13A and 13B schematically illustrate an embodiment of one color channel of an illumination system, according to principles of the present invention.
Figure 13B:
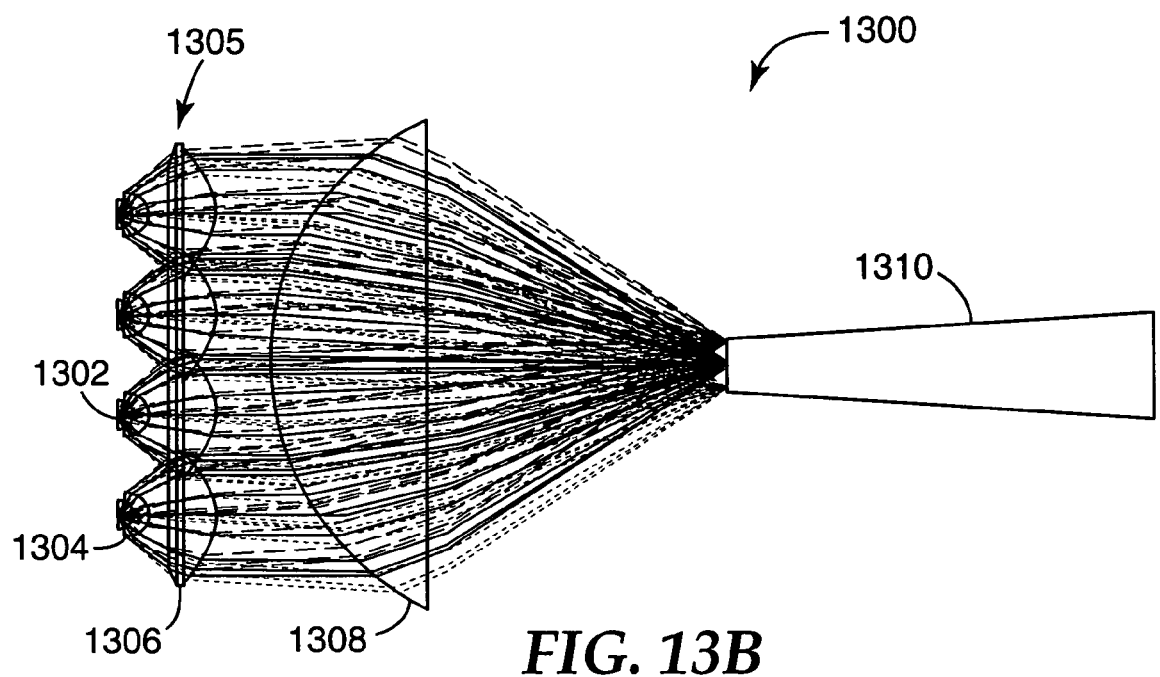

The arrangement 1300 for generating and collecting the light in each color channel of the illumination system is shown schematically in FIG. 13A. The arrangement 1300 includes an array of ten LEDs 1302, each LED 1302 having an associated first and second condensing lens 1304, 1306. Light from each of the second condensing lenses 1306 is collected by a common focusing lens 1308 and focused to the input to a tunnel integrator 1310. The tunnel integrator 1310 may be an internally reflecting tunnel integrator or be a hollow tunnel integrator with reflecting sidewalls. In many projection systems, an image of the output end of the tunnel integrator is relayed to the image-forming device (not shown). FIG. 13B shows a ray trace of light from the LEDs through the first and second condensing lenses 1304, 1306, and the common focusing lens 1308 to a focal plane that is approximately coincident with the input to the tunnel integrator 1310. The tunnel integrator 1310 may have parallel walls or may be tapered.

Figure 13C:
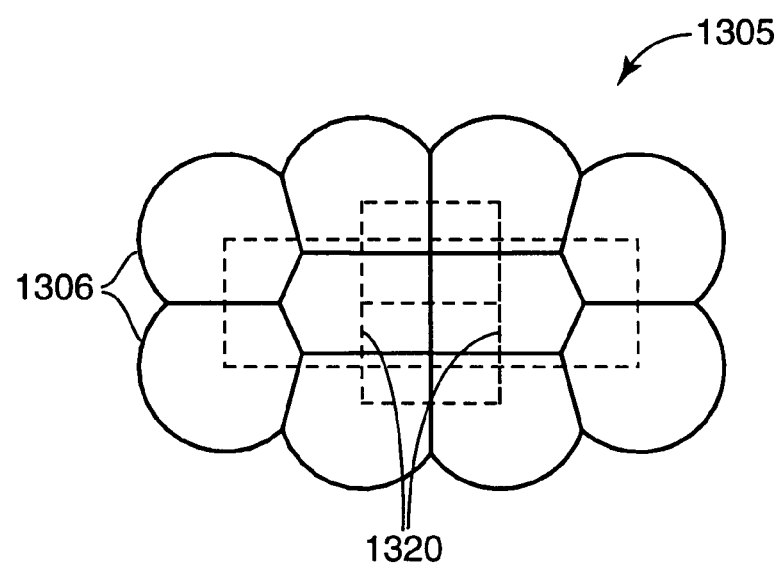
FIG. 13C schematically illustrates an embodiment of a lens array that may be used in the system of FIGS. 13A and 13B.

In some exemplary embodiments, the second condensing lenses 1306 may be molded as a sheet 1305, and some of the individual lenses 1306 may be truncated, for example as is schematically illustrated in FIG. 13C. Exemplary design parameters for the arrangement 1300 are shown in Table X.

TABLE X

Design parameters of illumination arrangement 1300

| | | R | T | material | CA |
|---|---|---|---|---|---|
| | LED dome | −2.800 | 0.00 | | 5.60 |
| 1 | 1$^{st}$ Condenser | −3.477 | 3.00 | Polystyrene | 7.20 |
| 2 | 1304 | −4.018 | 4.00 | | 7.84 |
| 3 | 2$^{nd}$ | 87.417 | 9.00 | Polystyrene | 25.5 |
| 4 | Condenser 1306 | −13.742 | 10.00 | | 24.4 |
| 5 | Focusing lens | 42.677 | 36.00 | Acrylic | 88.00 |
| 6 | 1308 | −149.553 | 51 | | 88.00 |
| 7 | Integrator 1310 | 0 | 50.00 | Silflex mirror | 8.58 × 8.58 |
| | | 0 | | | 8.58 × 15.34 |

The first column in Table X shows the surface number. The third column, R, shows the radius of curvature of a surface in millimeters, and the fourth column, T shows the separation from the previous surface, also in mm. The fourth column shows the material of the optical component. The Silflex mirror integrator is assumed to have optical properties of the SILFLEX-VIS™ coating on the internal surfaces of a Light Tunnel™, available from Unaxis Balzers Ltd., Division Optics, Liechtenstein. The fifth and sixth columns show the lens material and the clear aperture (CA) respectively.

The LED dome is the dome lens that is formed around the LED 1302. The first condenser lens 1304 may be made from any suitable glass or polymeric material. Surface 1 of the first condenser lens 1304 is, however, an aspherical surface in this embodiment, and so the first condenser lens is preferably molded for cost reduction. In this example, both surfaces of the second condenser lens 1306 are aspheric, as well as being truncated. The first and second lenses 1304 and 1306 are, in this example, both formed of polystyrene. The common focusing lens 1308 has two aspheric surfaces and, in this example, is made of acrylic. The tunnel integrator 1310 has a square input aperture having a side of 8.58 mm, and the output aperture is rectangular, with dimensions 8.58 mm×15.34 mm.

A listing of the coefficients for the aspherical surfaces is provided in Table XI.

TABLE XI

| | | | Aspherical coefficients | | | |
|---|---|---|---|---|---|---|
| ## | K | AD | AE | AF | AG | AH | AI |
| 1 | −0.8807 | 0 | 0 | 0 | 0 | 0 | 0 |
| 3 | 0 | −5.0502E−4 | 2.1307E−5 | −4.0218E−7 | 3.8535E−9 | −1.8276E−11 | 3.4502E−14 |
| 4 | −0.1244 | −4.2735E−4 | 8.7897E−6 | −6.6213E−8 | 9.2137E−11 | 9.9667E−13 | −2.4282E−15 |
| 5 | −0.4799 | −8.2217E−7 | 1.0622E−9 | −3.6365E−13 | 4.6315E−16 | −6.4592E−19 | 2.3830E−22 |
| 6 | −9.2081 | −2.2913E−6 | 1.0192E−8 | −1.2188E−11 | 6.1064E−15 | −9.1889E−19 | −6.0489E−23 |

Using the arrangement 1300 shown in FIGS. 13A and 13B for each color channel, a summary of the projection illumination system can be calculated, as shown in Table XII. Each channel was assumed to have ten LEDs, with total collection efficiencies as shown.

TABLE XII

| Uncompensated illumination system | | | | | |
|---|---|---|---|---|---|
| | | Color channel | | | |
| | | Blue | Green | Red | White |
| LED | | RB | G | R | |
| Number of LEDs | | 10 | 10 | 10 | |
| Collection Efficiency | | 6.46 | 6.12 | 6.89 | |
| White correction ratio | | 0.244 | 1 | 0.79 | |
| Input power (W) | | 9.8 | 40 | 7.9 | 57.7 |
| Color | X | 0.151 | 0.230 | 0.705 | 0.313 |
| coordinates | Y | 0.027 | 0.706 | 0.295 | 0.329 |
| Deviation from | Δx | −0.004 | −0.070 | 0.075 | 0 |
| SMPTE C | Δy | −0.043 | 0.111 | −0.045 | 0 |
| Geometrical lumens (lm) after dichroic color combiner | | | | | 628 |

The term "white correction ratio" represents the fraction of total possible output input taken in that color channel to achieve a white color that conforms to the white color standard. In this particular case, the illumination system was assumed to produce white light complying with the SMPTE C Standard (RP 145-1999) in which case the white light has the coordinates (0.313, 0.329). To achieve this white color, the green LEDs were assumed to operate at 100%, while the blue LEDs were operated at 24.4% of available power, the red LEDs were run at 79% of available power. Thus, the (x,y) coordinates of the red, green and blue channels 10 do not match as closely to the RP145-1999 color gamut discussed earlier.

The electrical power provided to the LEDs in each channel is shown, for a total input electrical power of 57.7 W. Also, the color co-ordinates are shown for each channel, along with the difference between the channel color coordinates and the color of an SMPTE C-color standard.

The total lumens in the color combined, white beam from the color combiner is 628, and so this source produces about 10.9 lumens/W.

Table XIII summarizes the performance of a compensated illumination system in which green LEDs are added to blue channel.

TABLE XIII

| Compensated illumination system | | | | | | |
|---|---|---|---|---|---|---|
| | | Color channel | | | | |
| | | Blue | | Green | Red | |
| LED | | G | RB | G | R | White |
| Number of LEDs | | 3 | 7 | 10 | 10 | |
| Collection Efficiency | | 1.89 | 4.50 | 6.12 | 6.89 | |
| White correction ratio | | 0.5 | 0.38 | 1 | 0.88 | |
| Input power (W) | | 6 | 10.6 | 40 | 8.8 | 65.4 |
| Color | x | 0.151 | | 0.230 | 0.705 | 0.313 |
| coordinates | y | 0.069 | | 0.706 | 0.295 | 0.329 |
| Deviation from | Δx | −0.004 | | −0.070 | 0.075 | 0 |
| SMPTE C | Δy | −0.001 | | 0.111 | −0.045 | 0 |
| Geometrical lumens (lm) after dichroic color combiner | | | | | | 685 |

To achieve the desired white color co-ordinates, the green LEDs in the blue channel are operated at 50% of full power and the blue LEDs are operated at 38% of full power. Thus, the input power to the blue channel is increased to 16.6 W (10.6W+6 W). The red LEDs in the red channel are also increased in power to 88%, corresponding to 8.8 W. Thus, the illumination system now has a total input power of 65.4 W, and the combined white beam after the x-cube corrector is calculated to have 685 lumens, an increase in brightness of 9%, and an output efficiency of 10.5 lumens/W. The maximum number of LEDs in each channel remains at ten, but there are now three green LEDs in the blue channel.

EXAMPLE 3

LEDs of additional colors may be used in the illumination system. For example, Lumileds Inc., San Jose, Calif. produces LEDs emitting at a center wavelength of about 617 nm, referred to as "red-orange" (for example model no. LXHL-PH01) and at about 590 nm, referred to as "amber" (for example model no. LXHL-PL01). If the green color band is 490 nm-600 nm and the red color band is 600 nm-700 nm, then the amber LED is in the green color band, and may be used to augment the red channel instead of the green LEDs.

A summary of such a system is shown in Table XIV below.

TABLE XIV

Compensated system with amber LED in red channel

| | | Color channel | | | | |
|---|---|---|---|---|---|---|
| | | Blue | Green | Red | | |
| LED | | G | RB | G | R | Amber | White |
| Number of LEDs | | 3 | 7 | 10 | 7 | 3 | |
| Collection Efficiency | | 1.89 | 4.50 | 6.12 | 4.82 | 2.07 | |
| White correction ratio | | 0.5 | 0.38 | 1 | 1 | 1 | |
| Input power (W) | | 6 | 10.6 | 40 | 7 | 3 | 66.6 |
| Color | x | | 0.151 | 0.230 | 0.686 | | 0.304 |
| coordinates | y | | 0.069 | 0.706 | 0.314 | | 0.334 |
| Deviation from | Δx | | −0.004 | −0.070 | 0.056 | | −0.008 |
| SMPTE C | Δy | | −0.001 | 0.111 | −0.026 | | 0.005 |
| Geometrical lumens (lm) after dichroic color combiner | | | | | | | 688 |

The blue and green channels are the same as discussed above in Table XIII of Example 2. The red channel, however, uses seven red LEDs and three amber LEDs to reduce the deviation of the red channel light from red color coordinates of the SMPTE C-standard, while maintaining substantially the same white color. The red and amber LEDs are operated at 100% power. The combined white beam following the color combiner is calculated to have a brightness of 688 lumens, approximately the same as the system summarized in Table XIII.

EXAMPLE 4

In another example, the red channel contains red-orange LEDs and amber LEDs. The resulting illumination system is summarized in Table XV.

TABLE XV

Compensated system

| | | Color channel | | | | |
|---|---|---|---|---|---|---|
| | | Blue | Green | Red | | |
| LED | | G | RB | G | R_O | Amber | White |
| Number of LEDs | | 2 | 8 | 10 | 8 | 2 | |
| Collection Efficiency | | 1.28 | 5.11 | 6.12 | 5.512 | 1.378 | |
| White correction ratio | | 0.75 | 0.34 | 1 | 1 | 1 | |
| Input power (W) | | 6 | 10.88 | 40 | 8 | 2 | 66.88 |
| Color | x | | 0.151 | 0.230 | 0.682 | | 0.308 |
| coordinates | y | | 0.069 | 0.706 | 0.317 | | 0.332 |
| Deviation from | Δx | | −0.004 | −0.070 | 0.052 | | −0.004 |
| SMPTE C | Δy | | −0.001 | 0.111 | −0.023 | | 0.003 |
| Geometrical lumens (lm) after dichroic color combiner | | | | | | | 700.8 |

In this system, the blue channel has eight blue LEDs and two green LEDs, operating at 34% and 75% power respectively. The green channel has ten green LEDs operating at 100% power. The red channel has eight red-orange LEDs and two amber LEDs, all operating at 100% power. The total electrical input power to the illumination system is 66.9 W and the color coordinates of the white light produced by the system are very close to the desired coordinates. The brightness of the white light beam, after dichroically combining the light in the red, green and blue channels, is 700.8 lumens, corresponding to 10.5 lumens/W. This is almost 12% brighter than the uncompensated illumination system summarized in Table XII.

When augmenting a color channel with LEDs emitting a wavelength outside the wavelength range of that color channel, it is preferred to place the augmenting LEDs symmetrically within the LED array, if possible. This helps to reduce color shift across the screen. Thus, for example, in the system summarized in Table XV, the two green LEDs in the blue channel and the two amber LEDS in the red channel may be located at positions in the array of LED corresponding to the lenses marked 1320 in the lens array 1305.

The present disclosure should not be considered limited to the particular examples described above, but rather should be understood to cover all aspects as fairly set out in the attached claims. Various modifications, equivalent processes, as well as numerous structures to which the present disclosure may be applicable will be readily apparent to those of skill in the art to which the present disclosure is directed upon review of the present specification. The claims are intended to cover such modifications and devices.

What is claimed is:

1. An optical system, comprising:
a first image-forming panel and a second image-forming panel;
a first array of light emitting elements to generate a first light beam associated primarily with a first wavelength range, the first light beam being directed to the first image-forming panel;
a second array of light emitting elements to generate a second light beam associated primarily with a second wavelength range, the second array of light emitting elements comprising at least a first light emitting element generating light in the second wavelength range and a second light emitting element generating light in the first wavelength range, the second light beam being directed to the second image-forming panel
wherein the first light beam illuminates the first image-forming panel and the second light beam illuminating the second image-forming panel.

2. A system as recited in claim 1, wherein the first and second light emitting elements are light emitting diodes (LEDs).

3. A system as recited in claim 1, wherein the first array of light emitting elements comprises a third light emitting element generating light in the first wavelength range and a fourth light emitting element generating light in the second wavelength range.

4. A system as recited in claim 1, further comprising a third array of light emitting elements to generate a third light beam associated with a third wavelength range, the third array of light emitting elements comprising at least a fifth light emitting element generating light in the third wavelength range.

5. A system as recited in claim 4, wherein the third array of light emitting elements comprises at least a sixth light emitting element generating light in one of the first and second wavelength ranges.

6. A system as recited in claim 5, wherein the third array of light emitting elements further comprises at least a seventh light emitting element generating light in the other one of the first and second wavelength ranges.

7. A system as recited in claim 4, wherein the second array of light emitting elements comprises at least an eighth light source generating light in the third wavelength range.

8. A system as recited in claim 4, wherein the first array of light emitting elements comprises at least a ninth light emitting element generating light in at least one of the second and third wavelength ranges.

9. A system as recited in claim 4, further comprising a third image-forming panel the third light beam illuminating the third image-forming panel.

10. A system as recited in claim 9, wherein a first color image beam propagates from the first image-forming panel, a second color image beam propagates from the second image-forming panel and a third color image beam propagates from the third image-forming panel, and further comprising a dichroic color combining unit that combines the first, second and third color image beams into a combined color image beam.

11. A system as recited in claim 1, wherein a first color image beam propagates from the first image-forming panel and a second color image beam propagates from the second image-forming panel, and further comprising a dichroic color combining unit that combines the first and second color image beams into a combined color image-beam.

12. A system as recited in claim 1, wherein positions of light emitting elements in the second array of light emitting elements are associated with respective geometrical collection efficiencies, the second light emitting element of the second array of light emitting element being located at a position within the second array of light emitting elements associated with a geometrical efficiency lower than the maximum value of geometrical efficiencies.

13. A system as recited in claim 1, wherein the light from the first array of light emitting elements is collected using respective refractive optical elements and directed by the respective refractive optical elements to the at least a first image-forming panel.

14. A system as recited in claim 1, wherein the light from the first array of light emitting elements is collected using respective focusing optical elements and directed into an input end of a tunnel integrator, light passing out of the output end of the tunnel integrator being directed to the at least a first image-forming panel.

15. A system as recited in claim 1, wherein the second array of light emitting elements comprises at least nine light emitting elements.

16. A system as recited in claim 1, further comprising an image controller coupled to the first image-forming panel to control an image formed by the first image-forming device.

17. A system as recited in claim 16, an image input and analysis unit coupled to the image controller, the image input and analysis unit receiving and analyzing image information, the image input and analysis unit delivering a signal related to a desired image to the image controller.

18. A system as recited in claim 1, further comprising at least one projection lens unit disposed to project an image light beam received from the at least a first image-forming panel.

19. A system as recited in claim 18, further comprising a projection screen, the image light beam being projected by the projection lens unit to the projection screen.

20. A system as recited in claim 1, wherein the at least a first image-forming panel comprises at least one of a liquid crystal display image-forming device and a digital multimirror device.

21. A system as recited in claim 1, further comprising a power supply coupled to provide electrical power to the light emitting elements of the first and second arrays of light emitting elements.

22. A system as recited in claim 21, wherein the power supply supplies electrical power to the light emitting elements continuously when the optical system displays an image.

23. A system as recited in claim 1, wherein the first wavelength range is one range of 400 nm to 490 nm, 490 nm to 600 nm, and 600 nm to 700 nm and the second wavelength range is another range of 400 nm to 490 nm, 490 nm to 600 nm and 600 nm to 700 nm.

24. A projection system for projecting a color image, comprising:
at least first, second and third image-forming panels, the first image-forming panel associated with a first color component of the color image, the second image-forming panel associated with a second color component of the color image and the third image-forming panel associated with a third color component of the color image;
a first array of light emitting diodes (LEDs) capable of generating a first light beam associated with the first color component, the first light beam being directed to the first image-forming panel;
a second array of LEDs capable of generating a second light beam associated with the second color component, the second light beam being directed to the second image-forming panel; and
a third array of LEDs capable of generating a third light beam associated with the third color component, the third light beam being directed to the third image-forming panel;
wherein the first LED array comprises at least one LED generating light of the second color component.

25. A system as recited in claim 24, wherein the first LED array further comprises at least one LED generating light of the third color component.

26. A system as recited in claim 24, wherein the second LED array comprises at least one LED generating light of one of the first and third color components.

27. A system as recited in claim 26, wherein the second LED array comprises at least one LED generating light of the first color component and at least one LED generating light of the third color component.

28. A system as recited in claim 26, wherein the third LED array comprises at least one LED generating light of one of the first and second color components.

29. A system as recited in claim 28, wherein the third LED array comprises at least one LED generating light of the first color component and at least one LED generating light of the second color component.

30. A system as recited in claim 24, wherein a first color image beam propagates from the first image-forming panel, a second color image beam propagates from the second image-forming panel and a third color image beam propagates from the third image-forming panel, and further comprising a dichroic color combining unit that combines the first, second and third color image beams into a combined color image beam.

31. A system as recited in claim 24, wherein positions of LEDs in the first LED array are associated with respective geometrical collection efficiencies, the LED of the first LED array generating light of the second color component being located at a position within the first LED array associated with a geometrical efficiency lower than the maximum value of geometrical efficiencies.

32. A system as recited in claim 24, further comprising an image controller coupled to the first, second and third image-forming panels to control images formed by the first, second and third image-forming panels.

33. A system as recited in claim 24, further comprising at least one projection lens unit disposed to project an image light beam received from the first, second and third image-forming panels.

34. A system as recited in claim 33, further comprising a projection screen, the image light beam being projected by the projection lens unit to the projection screen.

35. A system as recited in claim 24, wherein the first color component is associated with one wavelength range of 400 nm to 490 nm, 490 nm to 600 nm and 600 nm to 700 nm, the second color component is associated with another wavelength range of 400 nm to 490 nm, 490 nm to 600 nm and 600 nm to 700 nm.

* * * * *

UNITED STATES PATENT AND TRADEMARK OFFICE
CERTIFICATE OF CORRECTION

PATENT NO. : 7,422,330 B2  Page 1 of 1
APPLICATION NO. : 11/094671
DATED : September 9, 2008
INVENTOR(S) : Simon Magarill It is certified that error appears in the above-identified patent and that said Letters Patent is hereby corrected as shown below:

Column 11
Line 60 (approx.), delete "comer" and insert -- corner --, therefor.

Columns 15 – 16
Line 3, delete "Illumination system with compensated" and insert
-- Uncompensated illumination system --, therefor.

Columns 15 – 16
Line 3, delete "Uncompensated illumination system red and blue channels" and insert -- Illumination system with compensated red and blue channels --, therefor.

Column 19
Line 52, after "channels" delete -- 10 --.

Signed and Sealed this

Tenth Day of February, 2009

JOHN DOLL
*Acting Director of the United States Patent and Trademark Office*